United States Patent [19]

Sutcliffe et al.

[11] Patent Number: 6,073,105
[45] Date of Patent: Jun. 6, 2000

[54] INTERACTIVE PERSONALS ONLINE NETWORK METHOD AND APPARATUS

[75] Inventors: Andrew B. Sutcliffe, Tyngsboro; David S. Kramer, Waltham; Kevin A. Dunn, Boston, all of Mass.

[73] Assignee: Tele-Publishing, Inc., Boston, Mass.

[21] Appl. No.: 08/874,604

[22] Filed: Jun. 13, 1997

[51] Int. Cl.[7] .................................................. G06F 17/30
[52] U.S. Cl. ............................... 705/1; 705/1; 705/14; 705/34; 707/100; 707/101; 707/103; 707/104; 235/375; 235/379; 235/380; 395/185; 379/88; 379/92; 379/93
[58] Field of Search .......................... 705/1, 14; 340/825; 707/100, 101, 103, 104; 235/375, 379, 380; 395/185; 379/88, 92, 93

[56] References Cited

U.S. PATENT DOCUMENTS

| | | | |
|---|---|---|---|
| Re. 30,579 | 4/1981 | Goldman et al. | 340/149 R |
| Re. 30,580 | 4/1981 | Goldman et al. | 340/149 R |
| 4,651,150 | 3/1987 | Katz et al. | 340/825.34 |
| 4,739,322 | 4/1988 | Katz et al. | 340/825.34 |
| 4,792,968 | 12/1988 | Katz | 379/92 |
| 4,816,824 | 3/1989 | Katz et al. | 340/825.34 |
| 4,845,739 | 7/1989 | Katz | 379/92 |
| 4,930,150 | 5/1990 | Katz | 379/93 |
| 4,932,046 | 6/1990 | Katz et al. | 379/32 |
| 4,939,773 | 7/1990 | Katz | 379/204 |
| 4,987,590 | 1/1991 | Katz | 379/204 |
| 5,014,298 | 5/1991 | Katz | 379/93 |
| 5,016,270 | 5/1991 | Katz | 379/92 |
| 5,048,075 | 9/1991 | Katz | 379/92 |
| 5,073,929 | 12/1991 | Katz | 379/93 |
| 5,091,933 | 2/1992 | Katz | 379/204 |
| 5,109,404 | 4/1992 | Katz et al. | 379/88 |
| 5,128,984 | 7/1992 | Katz | 379/92 |
| 5,185,787 | 2/1993 | Katz | 379/204 |
| 5,218,631 | 6/1993 | Katz | 379/88 |
| 5,224,153 | 6/1993 | Katz | 379/93 |
| 5,251,252 | 10/1993 | Katz | 379/92 |
| 5,255,309 | 10/1993 | Katz | 379/88 |
| 5,259,023 | 11/1993 | Katz | 379/88 |
| 5,297,197 | 3/1994 | Katz | 379/204 |
| 5,347,306 | 9/1994 | Nitta | 348/15 |
| 5,349,633 | 9/1994 | Katz | 379/88 |
| 5,351,285 | 9/1994 | Katz | 379/94 |
| 5,359,645 | 10/1994 | Katz | 379/93 |
| 5,365,575 | 11/1994 | Katz | 379/92 |
| 5,412,708 | 5/1995 | Katz | 348/14 |
| 5,442,688 | 8/1995 | Katz | 379/156 |
| 5,491,743 | 2/1996 | Shiio et al. | 379/202 |
| 5,495,284 | 2/1996 | Katz | 348/15 |
| 5,553,120 | 9/1996 | Katz | 379/88 |
| 5,561,707 | 10/1996 | Katz | 379/88 |

(List continued on next page.)

OTHER PUBLICATIONS

GeoCities Homes Pages, http://www.geocities.com, 1995.
Advertise on GeoCities, http://www.geocities.com/main/info/company/advertise.html, 1995.
Join Geocities, http://geocities.com/cgi–bin/homestead/new_app, 1995.
Geocities File Manager, http://www.geocities.com/members/tools/file_manager.html, 1995.
Build & Ediit: GeoCities Builder, http://www.geocities.com/members/tools/editors/inter.html, 1995.
Bigfoot International, Inc, Bigfoot Registration, Bigfoot Advertisement Opportunities, http://www.bigfoot.com, 1996.
Match.Com Electric Classifieds, PR Newswire San Francisco, Oct. 30th.

*Primary Examiner*—James P. Trammell
*Assistant Examiner*—Nga B. Nguyen
*Attorney, Agent, or Firm*—Nutter, McClennen & Fish, LLP

[57] ABSTRACT

A system for providing personal advertisements over a public network and for matching personal advertisements of different users includes means for integrating data from a plurality of different storage devices into a single database accessible by a user over a public network. The database includes client and user profile information collected from users over the public network and through one or more call centers and adtaking systems.

17 Claims, 15 Drawing Sheets

OTHER PUBLICATIONS

| | | | |
|---|---|---|---|
| 5,568,540 | 10/1996 | Greco et al. | 379/89 |
| 5,657,376 | 8/1997 | Espeuth et al. | 379/89 |
| 5,675,507 | 10/1997 | Bobo, II | 340/825 |
| 5,740,549 | 4/1998 | Reilly et al. | 705/14 |
| 5,796,395 | 8/1998 | de Hond | 345/331 |
| 5,857,193 | 1/1999 | Sutcliffe et al. | 707/10 |
| 5,875,436 | 2/1999 | Kikinis | 705/34 |
| 5,893,111 | 4/1999 | Sharon, Jr. et al. | 707/104 |

Mail Box Table

| | BOX_NO | PASSWORD | EXPIRES | USER_ID |
|---|---|---|---|---|
| 163a | | | | |
| 163b | BOX_NO | PASSWORD | EXPIRES | USER_ID |
| ... | | | | |
| 163N | BOX_NO | PASSWORD | EXPIRES | USER_ID |

INTERACTIVE PERSONALS ONLINE NETWORK METHOD AND APPARATUS

GOVERNMENT RIGHTS

Not Applicable

RELATED APPLICATIONS

Not applicable.

FIELD OF THE INVENTION

This invention relates generally to networked systems and more particularly to a method and apparatus for integrating disparate databases over a computer network.

BACKGROUND OF THE INVENTION

As is known in the art, there is a trend to provide services and conduct business utilizing public computer networks. For example, due to the popularity of personals advertisements in newspapers and other print media and the increasing popularity of the Internet and the Internet's World-Wide Web there has been a trend to provide personals advertisement systems on computer systems accessible through public and private computer networks. Such personals systems are typically made available to users through computer programs used to locate resources on the World Wide Web generally referred to as Web browsers. Systems or services which are made available to users through the use of public computer networks are often referred to as being "online."

Online systems typically include a processing system generally referred to as a server which is coupled to the public network via a communications channel. System users transmit requests for information to the server over the public computer network using a predetermined communication protocol. The server responds to the requests fed thereto by providing the requested information to the system user. Such online systems, should preferably respond rapidly to requests by system users.

One problem in responding rapidly arises, however, when the server must access information which is remote to the server in order to access the requested information and provide the information to the system user. User requests for information often require the server to access an information database. If the information database containing the information is not provided as part of or is not readily accessible by the server, there is a concomitant delay in providing the information to the system user.

This problem is further exacerbated when the server is coupled between the public network and a private or local network having coupled thereto one or more databases which contain the information requested by the user. In this case, the server must first access the information database through the local network, locate and retrieve the desired information from the database and then transmit the information to the system user.

It would, therefore, be desirable to provide a system accessible by users over a public network and which integrates information from a plurality of disparate databases not accessible over a public network.

SUMMARY OF THE INVENTION

In accordance with the present invention, a computer system includes a first server system having a first port adapted to be coupled to public network and a second port, a local area network communication path coupled to the second port of the first server system, a local area network server coupled to the local area network communication path, a first user information database and a processor coupled between the first user information database and the local area network. With this particular arrangement, a computer system for implementing a personals online network (PON) and for displaying information to users over a public network and for retrieving information from disparate user information databases is provided. The first server system includes a server processor and a server user information database. The server processor receives information from the first user information database via the local area network and updates the server information database which corresponds to a personals online (PON) system database to thus allow users accessing the system via public networks to retrieve information entered into databases via newspapers or other print media. The PON system includes an audio recording system which allows users to record audio greetings and have the audio greeting accessible to other users over the public network. The PON system database utilizes a plurality of database tables to track, update and monitor user information and client information. Such information may be used to compute statistical information to determine how to present ads via a PON web site.

In accordance with a still further aspect of the present invention, a method for retrieving information from a remote data storage location and storing the information in a PON server coupled between a private network and a public network includes the steps of ordering an account status report for a predetermined client account, storing the account status report as a first file having a first predetermined file format in a first predetermined storage location on an audiotext system machine, transferring the first file from the audiotext system machine to a second file in a second predetermined file format in a second predetermined storage location of a server of a local area network and importing the file from the network server to the PON server for storage in a PON database. With this particular arrangement, a technique for retrieving information from one or more disparate databases for storage in a PON database is provided. The retrieved information corresponds to both user and client information. By having user and client information stored in a single PON database a PON system which can respond rapidly to user queries is provided.

BRIEF DESCRIPTION OF THE DRAWINGS

The foregoing features of this invention as well as the invention itself may be more fully understood from the following detailed description of the drawings in which:

FIGS. 4A–4J are a series of tables illustrating the structure of a portion of the database of the personals online system of FIGS. 1–3;

DESCRIPTION OF THE PREFERRED EMBODIMENTS

The following description sets forth an exemplary embodiment, in accordance with the present invention, of a personals online system for receiving personal advertisements ("personals"), storing the personals, and storing responses to the personals and making the personals accessible over a public network.

Before describing the system and techniques of the present invention, it should be appreciated that, in an effort to promote clarity, the invention is described with particular reference to methods and approaches for processing personal ads, it will be appreciated by those of ordinary skill in the art that various information in disparate databases can be processed by the apparatus and techniques claimed herein. Further, the particular network apparatus and architecture is illustrative only and can be varied without departing from the spirit of the invention.

For purposes of only illustration and not intended in any way to limit the scope of the present invention, the system and associated methods are sometimes described herein in the context of a user seeking to utilize the PON system to identify one or more persons with whom they can engage in a particular activity or with whom they can enter into a desired relationship. As mentioned above, those of ordinary skill in the art will understand that the system is not limited to generating lists of persons who may be compatible for particular activities or relationships. Rather, the system of the present invention can be used to utilize and collect information from a variety of disparate databases to produce a desired result.

Figure 1:
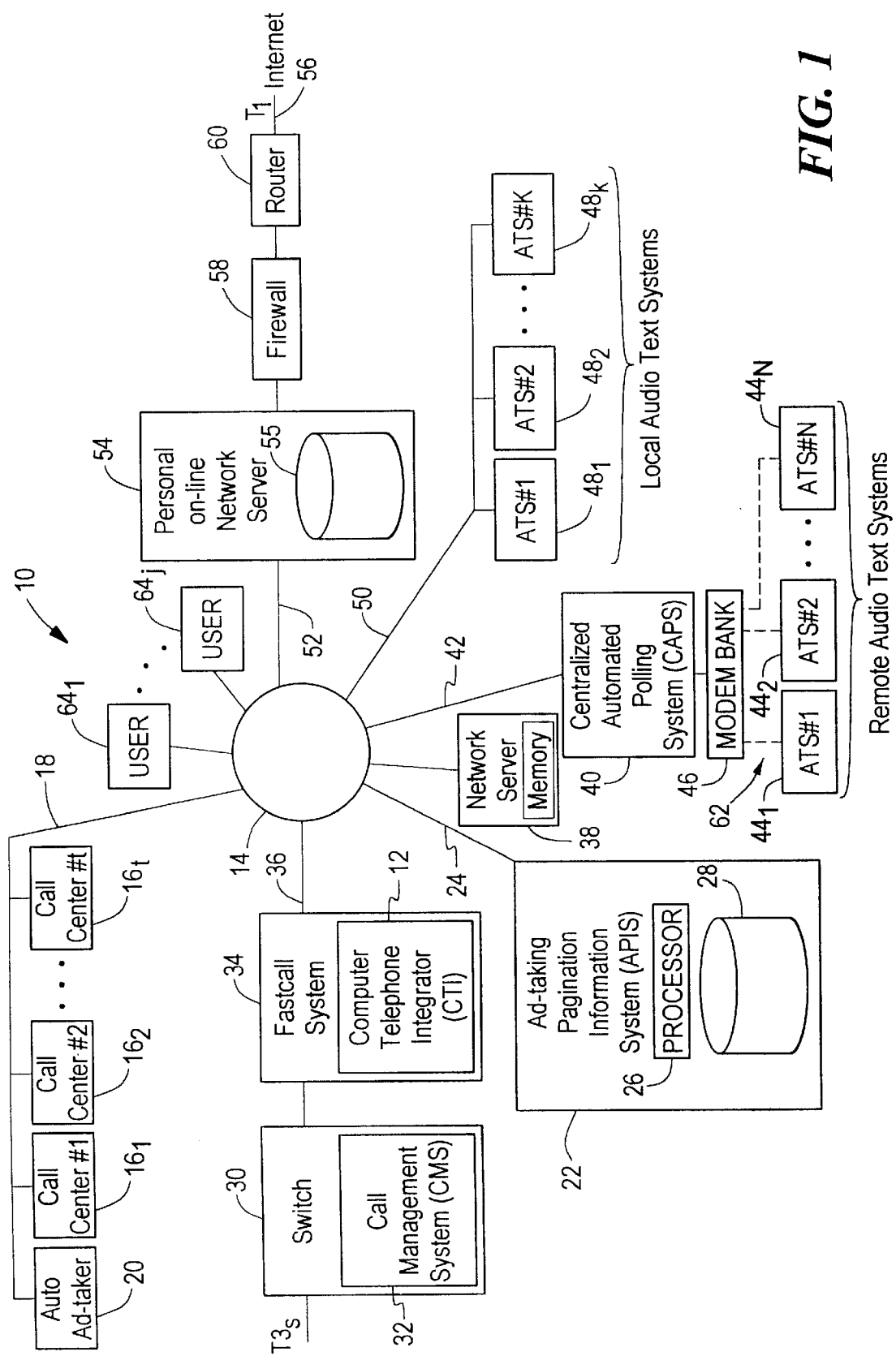
FIG. 1 is a block diagram of a system for placing and responding to personal advertisements including a plurality of disparate databases.

Referring now to FIG. 1, a network 10 is shown for receiving personal advertisements ("personals"), storing the personals and storing responses to the personals. While the present invention is described with particular reference to apparatus and methods for processing personal ads, it will be appreciated by those of ordinary skill in the art that various text can be processed by the apparatus and techniques described and claimed herein. Further, the particular network apparatus and architecture is illustrative only and can be varied without departing from the spirit of the invention.

The network 10 is used by a vendor to collect, store, process and distribute personals to one or more clients for publication and to store responses to the published ads. The network 10 includes a vendor network 14 which, in the illustrative embodiment, is a Local Area Network (LAN) 14.

A plurality of call centers $16_1$–$16_t$ for receiving personal ads via telephone lines are coupled to the vendor network 14 via a communication link 18, such as an Ethernet link. Each of the call centers $16_1$–$16_t$ includes one or more telephone and telephone lines and one or more computers, such as a personal computer or workstation. An operator, or ad taker is stationed at each of the one or more telephones and computers or work stations. The ad taker answers telephone calls from individuals seeking to place personal ads (i.e., advertisers) and enters information gathered from the advertisers onto the respective call center computer. Each ad taker has a particular set of skills which, for example, may include an ability to speak a foreign language or specialized training in taking ads for a particular client. Calls from advertisers are routed to a call center at which the ad taker is qualified to answer the particular call.

When an operator answers a telephone call, one or more ad taking screens appear on the display of the call center computer. The ad taking screens include a field identifying the client for which the ad is being placed and, further, include a plurality of fields that the ad taker completes in response to information provided by the advertiser. As examples, the advertiser provides and the ad taker enters the advertiser's name, address, telephone number, e-mail address (if any), category of the ad sought to be placed (e.g., female seeking male), text of the ad and answers to certain survey questions that the ad taker may ask. The survey questions may be developed by, and for the benefit of the vendor and/or the client.

Also coupled to the communication link 18 is an automated ad taker 20 by which personal ads can be placed via an automated telephone system. A caller to the automated ad taker 20 is prompted by a voice recording to answer a series of questions. The caller's answers are recorded and later transcribed onto ad taking screens of a call center computer.

Personal ads placed via the call centers $16_1$–$16_t$ or the automated ad taker 20 are stored in a database of an Ad Taking Pagination Information System (APIS) 22, referred to alternatively as an ad taking system, which is coupled to the vendor network 14 via a communication link 24, such as an Ethernet link. More particularly, APIS 22 includes a memory 28 in which the database is stored and a processor 26 on which one or more programs are executed for managing certain operations of the network 10, as will be described. In the illustrative embodiment, APIS 22 is implemented on an Alpha computer of Digital Equipment Corporation. The system 22 is described in a U.S. Patent application entitled "Ad Taking Pagination Information System" and identified by attorney docket no. 17778-26 which application is assigned to the assignee of the present invention and filed on even date herewith and incorporated herein by reference.

Also coupled to the vendor network 14 are a telephone switch 30 including a Call Management System (CMS) 32 and a Fastcall system 34 including a Computer Telephone Integrator (CTI) 12, both of which are products available from AT&T. The switch 30 is coupled between the Fastcall system 34 and a plurality of telephone lines, such as T3 lines, and routes the calls through the Fastcall system 34 to an appropriate one of the call centers $16_1$–$16_t$, as will be described. The Fastcall system 34 functions as an interface between the switch 30 and the network 14.

A plurality of local Audio Text System (ATS) machines $48_1$–$48_K$ are coupled to the vendor network 14 via a communication link 50, such as an Ethernet link. A plurality of remote ATS machines $44_1$–$44_N$ are coupled to the vendor network 14 via a first communication link, such as an Ethernet link 42, a Centralized Automated Polling System (CAPS) 40, a modem bank 46 and a plurality of telephone lines 62, as shown. The ATS machines permit telephone responses to personals published by the vendor's clients to be recorded, stored and accessed by the advertiser. Each of the ATS machines $44_1$–$44_N$ and $48_1$–$48_K$ includes a telephone interface to Plain Old Telephone Service (POTS) lines and T1 lines (not shown) through which personals responses are placed and accessed, a processor and media for recording and storing voice messages. In the illustrative embodiment, responses to ads are placed by calling a "900" number.

The voice recording media of each ATS machine is partitioned into a predetermined number of sectors (referred to as boxes), with each such box being telephone accessible by entering a number assigned to the box (i.e., a box number) and a corresponding security code. Associated with each box is a start date which indicates when the box is available and an end date which indicates when the box is no longer available.

The ATS machines $48_1$–$48_K$ are local in the sense of being located in relatively close proximity to the vendor and the ATS machines $44_1$–$44_N$ are remote in the sense of, generally, being located a significant distance from the vendor. Each of the remote ATS machines $44_1$–$44_N$ is located proximal to one or more of the vendor's clients, thereby enabling responses to personals to be made with less expensive telephone calls. In the illustrative embodiment, there are on the order of thirteen local ATS machines $48_1$–$48_K$ and on the order of eighty remote ATS machines $44_1$–$44_N$. However, it will be appreciated by those of ordinary skill in the art that the number of ATS machines, both local and remote, is a function of the number of clients serviced by the vendor, their geographic locations and the capability of each ATS machine.

The CAPS 40 communicates with the local ATS machines $48_1$–$48_K$ and the remote ATS machines $44_1$–$44_N$ for the purpose of obtaining certain statistical information from the ATS machines. Such statistical information includes, for each ad placed, a list of parameters applicable to the ad and is used to verify a profile of the client used in text production, as described further in conjunction with FIGS. 6, 7 and 7A. Production refers to the accumulation and processing of personal ad text by the vendor and distribution of such text to a client. The client profile includes a list of various ad parameters and a corresponding weight assigned to each listed parameter, as will be discussed. CAPS 40 polls local and remote ATS machines at predetermined times (i.e., scheduled polling) as a function of the timing of production, and may also poll ATS machines in response to specific requests by APIS 22.

CAPS 40 also communicates with the ATS machines $44_1$–$44_N$, $48_1$–$48_K$ at the request of APIS 22 for the purpose of obtaining new box numbers and security codes to provide to advertisers and to cancel boxes whose end date has occurred. More particularly, APIS 22 stores one or more "box pools" (FIG. 4) for each of the vendor's clients, with each box pool including a list of box numbers and corresponding security codes available to the client's advertisers. APIS 22 includes a box management program executed on the processor 26 by which the box pools are replenished and boxes are canceled, as described in conjunction with FIGS. 5 and 5A.

The vendor network 14 may be further coupled to the Internet. To this end, a Personals Online Network Server (PONS) 54 is coupled to a T1 line 56 to the Internet, typically via a firewall 58 and a router 60, as shown. Personal ads placed via the call centers $16_1$–$16_t$ may be posted on a client's web site via the server 54. Alternatively, personal ads may be posted directly onto the Internet. Further, responses to personals accessible via the Internet may be in the form of e-mail responses over the Internet.

PONS 54 includes a PON database 55 in which is stored user and client information for each system user and client. This includes both users who enter information into the system databases via the internet and users who provide information to the databases via ATS machines 44, 48. For users who provide information via ATS machines 44, 48 APIS 22 provides advertisement and user information from newspaper clients which utilize APIS (e.g. so-called "camera ready" clients) to PON database 55. A PON server receives the information and updates PON database 55. PON database 55 is updated periodically (e.g. once per week). Such transfer of information from may be controlled by CAPS 40. One particular technique for transferring information from ATS machines 44, 48 to PON 54 is described below in conjunction with FIG. 5.

If a user enters information through PON 54, the user is queried to determine if the user is associated with a newspaper client. If the user decides to place an advertisement in the newspaper, the user is asked (via a web page form) to modify a copy of their present newspaper advertisement such that it will fit the newspaper's length guidelines for advertisements (if needed). The pertinent information gets e-mailed to a call center adtaker who manually enters the advertisement in the paper. It should be noted that the full version of the advertisement remains intact on the web site.

Whether the member has a newspaper advertisement or not, the information for their advertisement (as well as their user profile data) are entered on a web page form. If the member has an advertisement in the newspaper, that advertisement and some or all of the member's profile will be sent to the PONS database 55 either by APIS or by the client the week it is added (and every week until it expires). The member performs no actions to get their advertisement on the web, and may not even know it's there.

In this case, PON 54 identifies the file format, imports the file and stores the information in PON database 55. PON 54 may receive files in a plurality of different file formats. For example, PON 54 may receive a text file having a tab delimited file format in which each field in a record are separated by a tab character (i.e. an ASCII character 9). The end of a record is marked by a newline character. Since the names of the fields are not included in the file, every record must have the same fields in the same order. The particular order may be customized on a client by client basis. If the file contains a new advertisement, then PON 54 automatically adds the new advertisement. If, on the other hand, the file contains a modification to an existing advertisement, then PON 54 automatically updates the existing advertisement. Alternatively, PON 54 may receive a text file having a named field file format in which each field in a record is on a separate line prefaced by the name of the field and an equal sign. In this case, since the names of the fields are included in the file, all records need not specify the same optional fields nor do the fields need be in the same order. A blank line signifies the end of a record. As with the tab delimited format files, if the file contains a new advertisement, then PON 54 automatically adds the new advertisement and if the file contains a modification to an existing advertisement, then PON 54 automatically updates the existing advertisement.

One or more user machines $64_1$–$64_j$ located at the vendor's facility are coupled to the vendor network 14 for purposes of maintenance, monitoring and updating the system. Such user machines $64_1$–$64_j$ typically take the form of personal computers, such as Apple Macintosh computers. A network server 38 is likewise coupled to the vendor network 14 and manages various communications between network components, as will be described.

Figure 2:
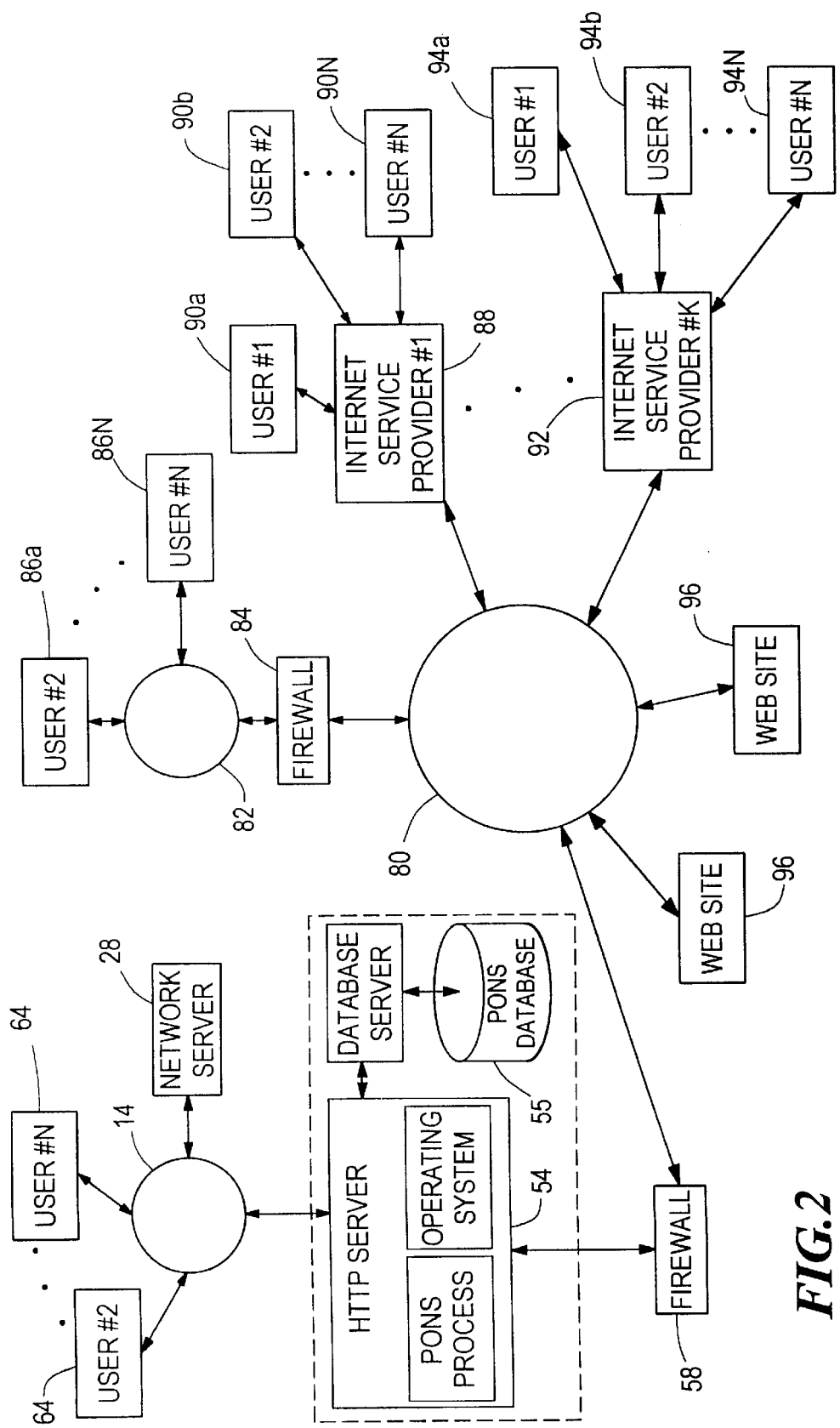
FIG. 2 is block diagram of a personals online system coupled between a private network and a public network.

Referring now to FIG. 2, a public network or Internet 80 is coupled to a private network 82 through a firewall server 84. Coupled to private network 82 are a plurality of users 86a–86N generally denoted 86. As used herein, the term "internet" generally refers to any collection of distinct networks working together to appear as a single network to a user. The term "Internet", on the other hand, refers to the so-called world wide "network of networks" that are connected to each other using the Internet protocol (IP) and other similar protocols. The Internet provides file transfer, remote log in, electronic mail, news and other services.

As described herein, the exemplary public network 80 of FIG. 1 is for descriptive purposes only. Although the description may refer to terms commonly used in describing particular public networks such as the Internet, the description and concepts equally apply to other public and private computer networks, including systems having architectures dissimilar to that shown in FIG. 2.

One of the unique aspects of the Internet system is that messages and data are transmitted through the use of data packets referred to as "datagrams." In a data gram based network, messages are sent from a source to a destination in a manner similar to a government mail system. For example, a source computer may send a data gram packet to a destination computer regardless of whether or not the destination computer is currently powered on and coupled to the network. The Internet protocol (IP) is completely sessionless, such that IP data gram packets are not associated with one another.

The firewall server 84 is a computer which couples the computers of a private network or server e.g. network 82 to the Internet 80. Firewall server 84 may thus act as a gatekeeper for messages and data grams going to and from the Internet 80.

Also coupled to Internet 80 through a second firewall server 58 is a personals online system 70. System 70 may include a file server, a file transfer protocol (FTP) server and a PON server 54. In this particular embodiment, server computer 54 is provided as a Hypertext Transfer Protocol (HTTP) server. HTTP server 54 and network server 28 are coupled via communication path 14. HTTP is a network protocol used for transmission of files and other data on the worldwide web. Thus HTTP servers are commonly referred to as web servers. Remote users 86, 90, 94 may communicate with HTTP server 54 using a software application known in the art as a web browser. A web browser and web server have a client-server type relationship. More specifically, a web browser is an HTTP client which sends requests to an HTTP server. The HTTP server responds to the request by transmitting to the HTTP client resources identified by the request. Resources may be located on the Internet 80 using a Uniform Resource Locator (URL).

Resources that may be addressed over the Internet 80 include Hypertext Markup Language (HTML) files. HTML is document description language that defines the various components of the worldwide web page. Worldwide pages often include text and graphics as well as "links" which allow a viewer of the page to address other resources on the Internet including other HTML pages.

Resources that may be addressed over the Internet 80 also include software application programs. The Common Gateway Interface (CGI) is a standard for interfacing external software applications with information servers such as HTTP servers. A CGI program may be written in any programming language that may be executed on the computer network 14. Suitable programming languages include C/C++, Fortran, PERL, TCL, any Unix shell, Visual Basic or Java.

The Exemplary HTTP server 86 executes one or more CGI programs resident therein. The CGI programs may be executed on server 54 or on a separate computer connected to server 54 such as network server 28. The CGI programs may access an operating system in order, for example, to access variables early into the computing environment in which the CGI programs are executed. Server 54 is coupled to a database server which accesses an information database 55.

Server 58 provides information from database 55 over network 80 to properly authorized ones of users 86, 90, 94. The function of PON server 54 will be described in detail herein below. Suffice it here to say, however, that PON server 54 receives requests from users and in response to such requests provides information related to personals ads. PON server 54 also processes information, stores information in user information database 55, and receives information from and transmits information to other databases coupled to a private network.

An Internet service provider 88 is also coupled to the Internet 80. A service provider is an organization that provides connections to a part of the Internet. Internet service provider 88 includes a processor which couples a plurality of users 90a–90M to the Internet 80. Thus, users 90a–90M are coupled to the public network 80 through internet service provider 88. Also coupled to the public network 80 are a plurality of web sites or nodes 96. When one of the users 86, 90 wishes to conduct a transaction at one of the nodes 96, the user 86, 90 accesses the node 96 through the Internet 80.

Each node 96 in the system shown in FIG. 2 is configured to understand which firewall and node to send data packets to given a destination IP address. This may be implemented by providing the firewalls and nodes with a map of all valid IP addresses disposed on its particular private network or another location on the public network 80. The map may be in the form of prefix matches up to and including the full IP address.

User information and client information is stored in database 55. The information need only be stored once. The information may be stored, for example, as a record or as a file. The information for each particular user is stored in a particular data structure in database 55.

Database 55 may be provided, for example, as an object-oriented database management system (DBMS), a relational database management system (e.g. DB2, SQL, etc.) or another conventional database package. Thus, the database 55 can be implemented using object-oriented technology or via text files.

Figure 3:
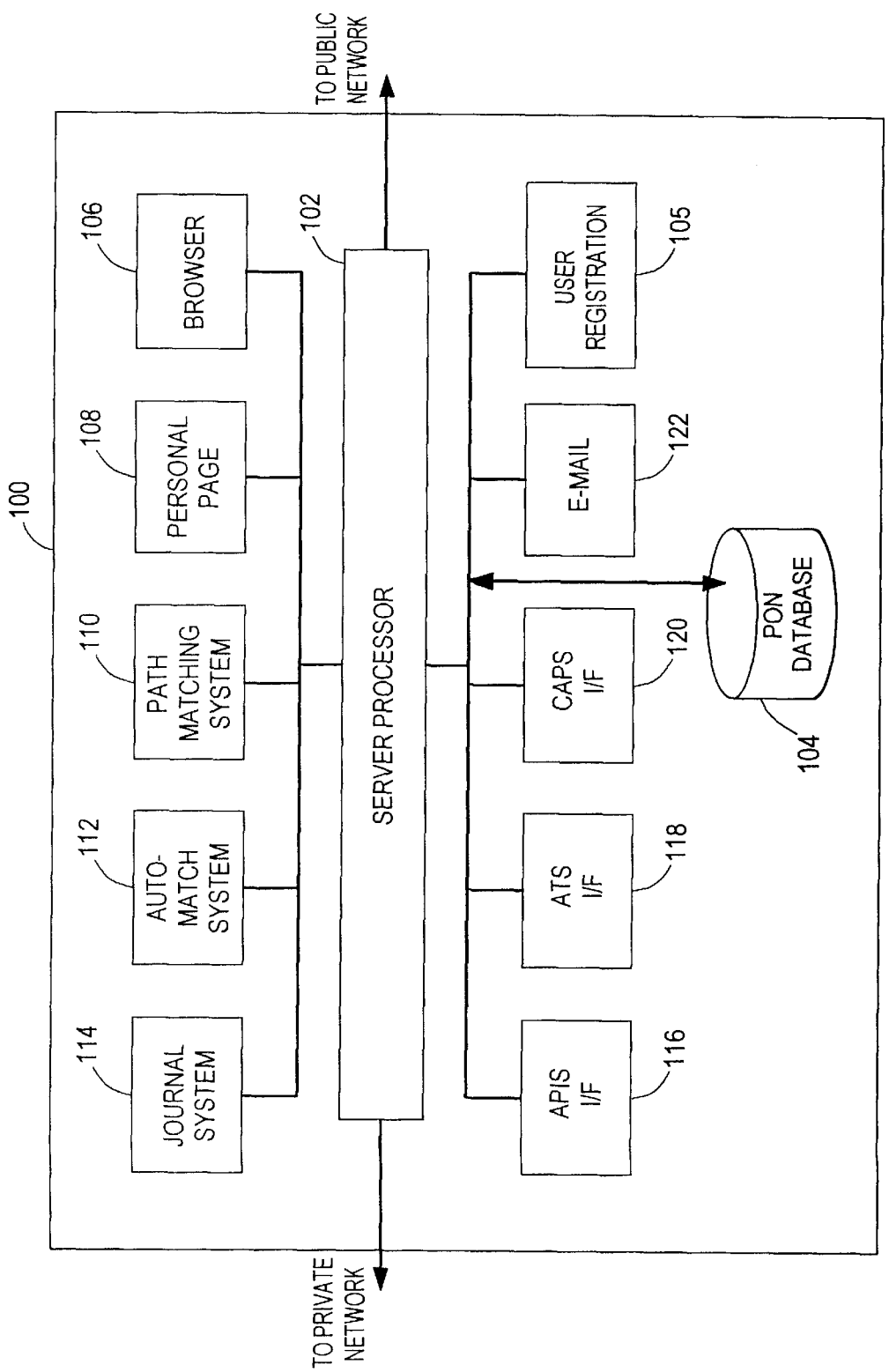
FIG. 3 is a simplified block diagram of a personals online system.

Referring now to FIG. 3, a personals online network system 100 includes a server processor 102 which may be similar to server 54 described above in conjunction with FIGS. 1 and 2 which is adapted to couple to a private network and to a public network for operation as described above in conjunction with FIGS. 1 and 2. Server processor 102 is coupled through a database server to a PON database 104. The database server has here been omitted for clarity but are well known to those of ordinary skill in the art. Server processor 102 is also coupled to a user registration system 105. When a user contacts PON system 100 over a public network, the user has the option of becoming a member of the system 100, logging into system 100 as an existing member of system 100 or browsing information as a non-member. If a user elects to become a member. user registration system 105 prompts (e.g. by displaying a web page to the user) a user to provide an indication as to whether or not the user has become a member of the PON system 100 (i.e. whether the user has entered profile information to be stored in PON database 104). If user information is not yet stored in PON database 104, registration system 105 provides the user with the option of joining the PON system 100. Joining or becoming a member of or joining the PON system means that the user has provided information to the server processor 102 via registration system 105 and that the user information is stored in PON database 104. Thus, if the user is not a member of the PON system, the user is prompted to provide information which is stored in database 104 for later processing and retrieval.

If the user elects not to become a member of the PON system, the user has access to a browser system 106 which allows the user to review certain information already stored in PON database 104. As mentioned above, a browser is an application program which allows a user to view information in a particular format. If the browser is compatible with a "web server", the browser is often referred to as a web browser.

PON system 100 also includes a personal page system 108 which allows a user to generate a page for displaying on a computer system information which is accessible through the public network by a remote user. The personal page system is described in copending patent application Ser. No. 08/876,008, entitled METHOD AND APPARATUS FOR PROVIDING A PERSONAL PAGE filed on even date herewith, assigned to the assignee of the present invention, and incorporated herein by reference.

System 100 also includes a path matching system 110 which allows users to select a series of images or other sensory stimuli and which notifies users of other users who have selected some or all of the same images or other sensory stimuli. The heuristic matching system 110 is described in fuller detail in copending patent application Ser. No. 08/876,006 entitled SYSTEM FOR MATCHING USERS BASED UPON RESPONSES TO SENSORY STIMULI filed on even date herewith, assigned to the assignee of the present invention and incorporated herein by reference.

System 100 also includes an automatch system 112. Automatch system 112 utilizes the information in PON database 104 to automatically match users who have like preferences and who are seeking to engage in similar activities. The automatch system 112 is more fully described in copending patent application Ser. No. 08/874,564, entitled METHOD AND APPARATUS FOR MATCHING REGISTERED PROFILES filed on even date herewith, assigned to the assignee of the present invention and incorporated herein by reference.

System 100 also includes a journal system 114 which provides a system for tracking personal contacts made through PON 100. Journal system 114 includes means for identifying other users of the personal system, means for generating journal entries corresponding to the other users, means for storing the journal entries and means for displaying the journal entries for viewing by a selected user. Journal system 114 is more fully described in copending patent application Ser. No. 08/866,212, entitled PERSONAL JOURNAL filed on even date herewith, assigned to the assignee of the present invention and incorporated herein by reference. It should be noted that systems 108–114 are available only to members who have entered the system through user registration system 105 (i.e. users who have "joined" system 100).

PON system 100 further includes an ad taking pagination information system (APIS) interface 116 which allows transfer of information between PON system 100 and in particular PON database 104, and APIS system 22 (FIG. 1). The APIS interface 112, provides a channel through which APIS can provide ads or user information from newspapers that use APIS (i.e., "camera ready clients"). PONS 100 receives the information and updates the PON database 122. Such information may be transferred from APIS 22 to the PON database 122 periodically. For example, each client in the PON database 122 may updated once per week.

System 100 also includes an audiotext system (ATS) machine interface 118 which allows transfer of information between ATS machines such as ATS machines 44, 48 described above in conjunction with FIG. 1, and PON system 100.

PON system 100 also includes a centralized ad taking poling system (CAPS) interface 120 which allows information to be transferred between CAPS system 40 (FIG. 1) and PON 100. The CAPS system 40 provides information to the PONS system through APIS or alternatively the ATS information in the form of status reports may be downloaded to the network manually by a user.

If the user's first access to the system is through the system 100, and the user desires to place a newspaper advertisement in addition to establishing a personal journal and personal page on the PONS system 100, then an email is sent to a call center representative (i.e. an adtaker) and the adtaker manually enters the information into the APIS system. Clients who are not "camera ready" transmit via email to PON a file in a particular file format. PON system 100 determines the particular file format, imports the file and accepts the information into database 122.

System 100 further includes an electronic mail system (e-mail) 122 which allows electronic mail to be sent between users who have entered information into PON database 104 via user registration system 105. E-mail includes anonymous e-mail as described in the above-mentioned copending patent application entitled PERSONAL JOURNAL.

Figure 4:
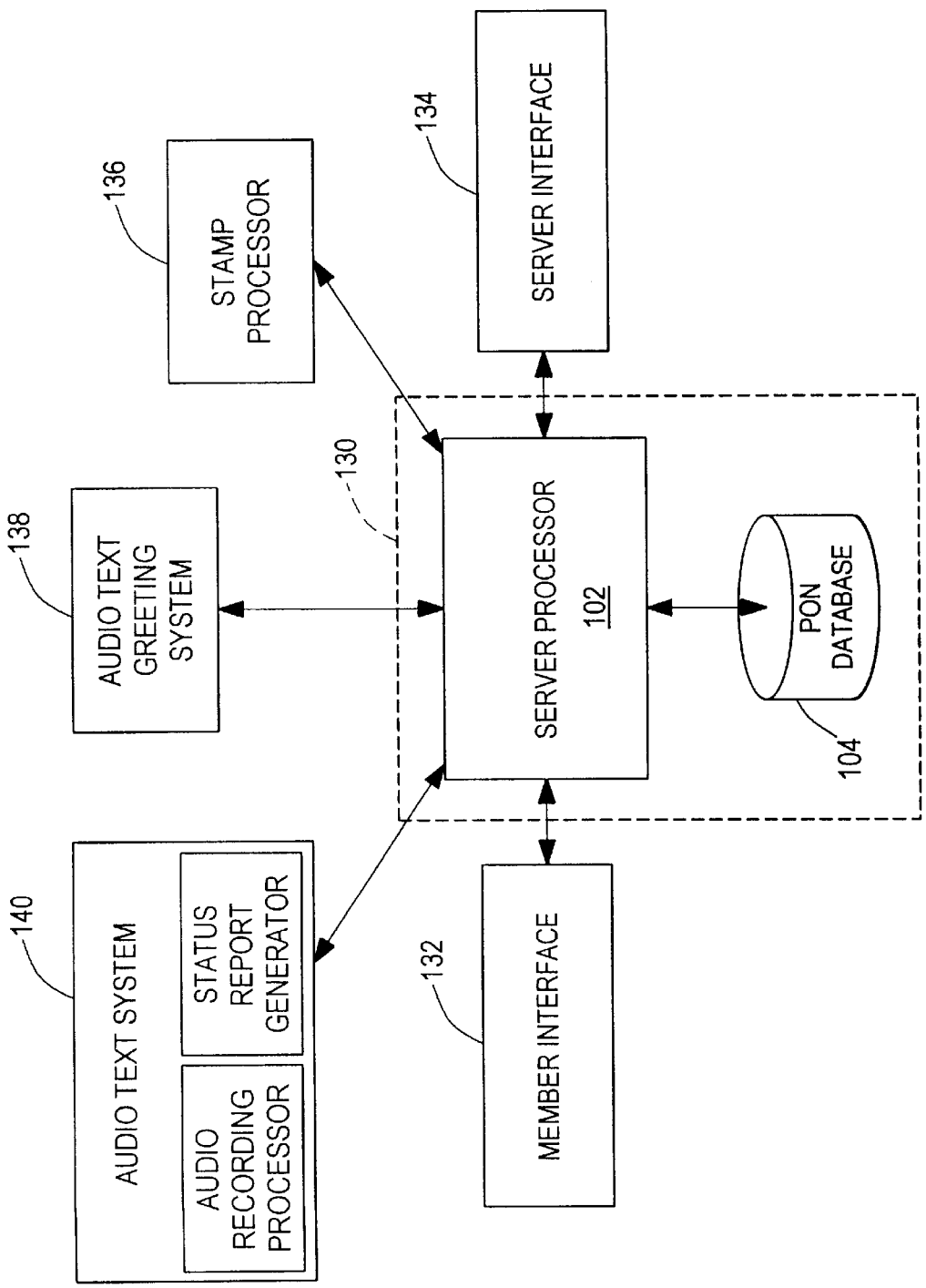
FIG. 4 is a simplified block diagram of illustrating the interaction of a the personals online system to receive and transmit information.

Referring now to FIG. 4, PON system 130 includes server processor 102 coupled to a member interface 132, a server interface 134 and the PON database 104. Member interface 132 allows users to interface with server 102 over the public network while server interface 34 allows server processor 102 to communicate with a private network such as local area network 14 including network server 38 described above in conjunction with FIG. 1. Server processor 102 may include a plurality of different server application programs. For example, server processor 102 may execute an HTTP server application program (i.e. an HTTP or web server), an FTP server application program (i.e. an FTP server), a network server application program (i.e. a network server) or a database server application program (i.e. a database server).

Also coupled to processor 102, are one or more audiotext system machines 140 each including an audio recording processor and a status report system. The audio recording processor 140 is used to record greetings for in-house newspaper clients and status report generator generates client account status reports to be provided to server 100. Such status reports are used to update the information in PON database 104. "In-house" clients refer to those clients which utilize ATS machines having a direct connection to a private network such as network 14 (FIG. 1) to which the PON system is coupled.

At predetermined times, the ATS machines 140 copy files to a storage device coupled to a private local area network (LAN) such as LAN 14 (FIG. 1). The storage device may be provided as part of the network server 38 (FIG. 1) for example. Server processor 102 periodically examines directories in the private network server for files which require processing such as voice greeting files, mailbox request files, stamp files or status report files. If server processor 102 determines that such files exists, then the processor 102 takes predetermined action depending on the type of file which is found. For example, if a greeting file is found in the audio recording processor, then server 102 transfers the file from ATS system 140 to server processor 102. During such transfer, it may be necessary to convert the files from one form to another.

For example, the audio file may be stored in a first file format on the ATS machine 140. For storage in PON database 104 it may be necessary to convert the file from the first format to a second different format and to rename the file. For example, the file may be renamed to correspond to a "handle" of the user who recorded the file. Such renaming and file reformatting facilitates processing of the information in PON database 104.

Similarly, processor 102 may locate the existence of other types of files such as box files or order files. If server processor 102 determines that box files exist, then processor 102 stores the files so that it can later assign the boxes for use in audio greetings. In response to locating order box files, processor 102 requests assignment of more mailboxes for use in audio greetings.

If a client is not a newspaper client, then users record an audio greeting via audiotext greeting system 138. To use system 138 a user must first receive a box number from the PON system 130. Via member interface 132, a user indicates a desire to record a voice greeting. This may be accomplished, for example, by using a graphical user interface (GUI) to select an icon or "button" displayed on a computer screen of a user (i.e. the user "clicks on a button"). A box number is allocated from a mailbox table such as a table 162 described below in conjunction with FIG. 4J, provided as part of database 104. Thus a mailbox is selected from a list of mailboxes available to PON system 130.

Server 102 transmits the box number over the public network to the user's computer where the box number is displayed to the user. The system 130 also provides a telephone number such as a "toll free" telephone number which the user should call to record the voice greeting. Thus, the user calls audiotext greeting system 138 and records a greeting on a local ATS machine. Once the greeting is approved, a greeting file is copied to a local area network server such as server 38 (FIG. 1) at a specified location and is given a predetermined file name extension.

The mailboxes are thus allocated when the user asks to record a voice greeting via system 138. The boxes are freed when the greeting arrives on the web server and is converted to a predetermined file format such as a RealAudio file format. The particular processing which takes place to record a greeting is described in more detail below in conjunction with FIG. 6.

A stamp processor 136 allows a user to purchase "stamps" over the public network. Stamps are used when one user wishes to contact another member of the personals online network as well as other "pay for" vendor services. Stamp processor 136 allows secure online credit card purchases of stamps. Thus, the stamps are used to send anonymous e-mails and to prepay responses for other users to respond to your e-mails are used to generate personal page information and are used for updating personal journal profiles. If a user elects not to purchase stamps, the user may still receive e-mails, search through personal advertisements, create an initial personal page, add people to their journal and utilize the heuristic matching technique of PON system 130. Stamp processor 136 thus provides stamp confirmation to the web server 100 and database 122.

In operation a user can buy stamps by ordering stamps online, or by ordering stamps offline, or by calling a toll free telephone number and reaching a customer service operator who receives a credit card number from the user or calling a toll telephone number (e.g. a "900" number) which leads to an interface to an audiotext system. Alternatively still, user can send a personal check to buy stamps. Stamps are used to send e-mail, generate a personal page, update a personal page profile or it can be used to prepay for return email.

If a user does not buy stamps, the user can still receive e-mail, search through ads, create an initial personal page, add people to their journal and play the path portion of the PONS system.

Figure 4A:
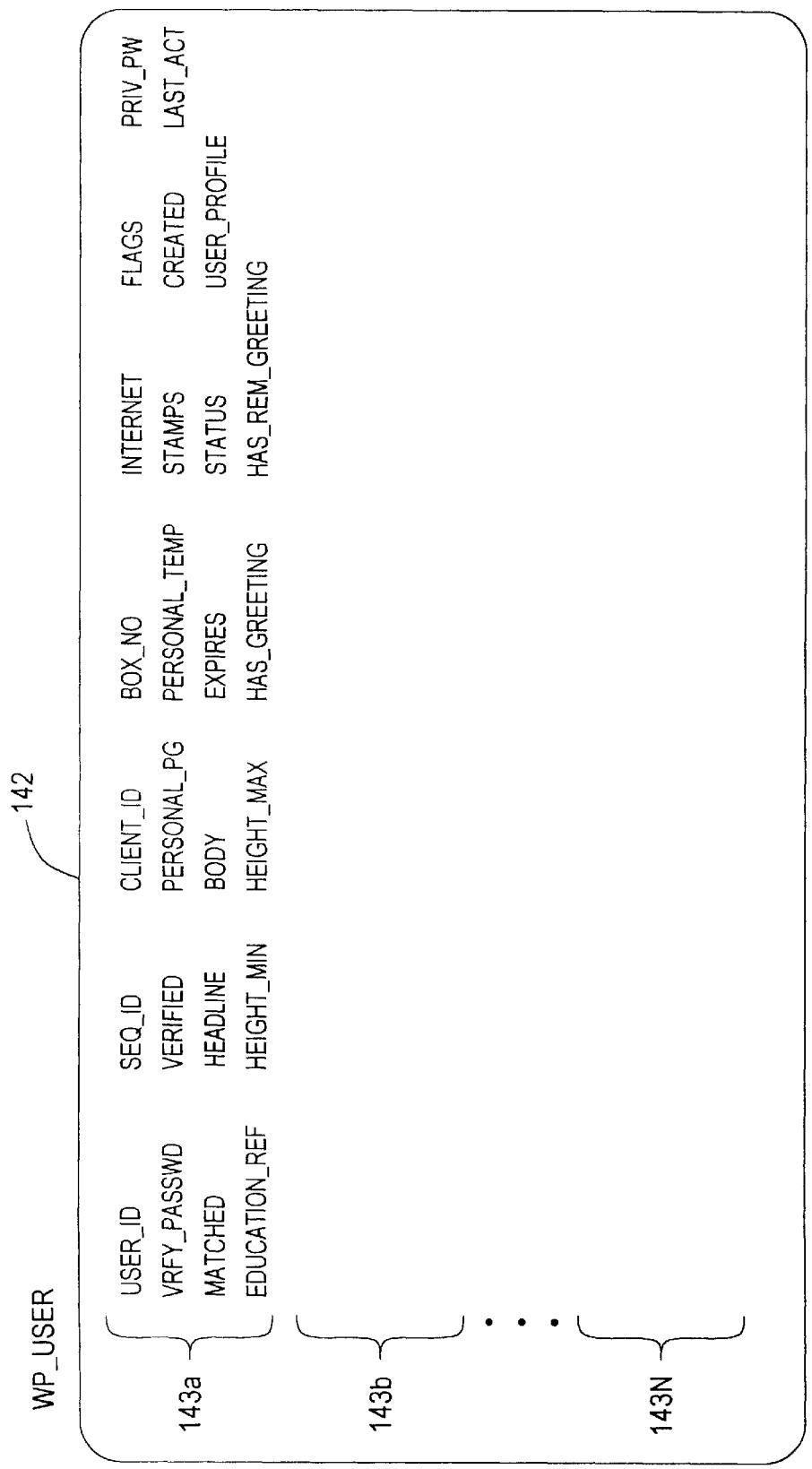

Referring now to FIGS. 4A–4F, a portion of the PON database 104 (FIGS. 3, 4) contains user information shown in FIGS. 4A–4F as series of tables, 142, 144, 146, 148, 150, 152, 154, 156 each of which include a plurality of fields. In FIG. 4A, user information table 142 includes information stored for each system user (i.e., user #1, . . . user #N). While database content is shown in detail for user #1, the same type of information is stored for each of the N users. For each of N users, the database table 142 has a corresponding row 143a–143N, which contains a USER_ID field in which a unique identifier of the particular user is stored. Thus, in the case where the vendor has "N" users "N" such user identifying fields USER_ID are stored. In the illustrative embodiment, the user identifier field USER_ID contains a user defined alpha numeric name or handle which a user selects and inputs into the system in response to a system prompt generated by user registration system 105 (FIG. 3). The handle is used to identify the respective user in the system. The USER_ID field is a so-called primary key and is used to relate to other tables. Row 143a also includes a field SEQ_ID which contains a number assigned to each user. Each number is greater than the last user and is used for searches to mark by the last page left off. As each user is added to the system, the user receives a SEQ_ID value which is incremented to be one greater than the value assigned to the immediately preceding user. The SEQ_ID value is utilized as a smaller (i.e. fewer characters) relatively rapid primary key used to sort user records during searching.

A CLIENT_ID field is received from a client information table 160 which will be described below in conjunction with FIG. 4I and identifies a client. A BOX_NUMBER field contains a mail box number from a mail box of an audiotext system (ATS) used to record a greeting if imported from a newspaper. The password and expiration date for the mailbox is held in a table called WP_BOXES described below in conjunction with FIG. 4J. An INTERNET field contains an indication of whether the user signed up through the Internet. A FLAGS field holds one or more values of different options including whether the user should receive auto match mailings, whether the user should receive a warning for costs to hear greetings, whether a mailing was sent to this user because they are not verified or whether a mailing was sent to this user because they are verified but not using a system. A PRIV_PW field contains a password used by the user to log on to the PON world wide web page.

The PON system 100 sends the user an initial e-mail which requests a reply from the user. The purpose of the initial e-mail is to verify the user's e-mail address. A VRFY_PASSWD field contains a four digit number included in the verify e-mail to ensure the e-mail received from a user in response to an e-mail sent by PON system 100 is from the appropriate user. A VERIFIED field is used to verify that an e-mail address has been verified. A PERSONAL_PG field contains a code indicating the template code of a user's personals page.

Field PERSONAL_TEMP holds a template code of a personal page currently being edited. Thus, when a user wants to change to a different template or edit their existing personal page template this field contains a value which tracks which template is being used by the user. It should be noted that any information which is common between an existing template and a new template s is automatically copied from the existing template to the new template and thus will continue to be shown on a users personal page.

A STAMPS field contains a value corresponding to the number of stamps remaining for a user. A CREATED field contains the date on which the user account was created. For example, if the user joined the PON system on one date (e.g. by entering information in PON database 104 (FIG. 3) through user registration system 105 (FIG. 3), this date can be different than the date on which a personal advertisement was created by the user. It should be noted that each user only has one personal advertisement. A LAST_ACT field contains the date on which the user last logged into the PON system though a public network such as the Internet, for example. A MATCHED field contains the date on which a user was last matched to another user. Such matching may be accomplished for example via the heuristic matching system 110 (FIG. 3) or the automatch system 112 (FIG. 3).

A plurality of fields are also used for user contact information not accessible through the World Wide Web. Such fields are here represented as a USER_CONTACT field. USER_CONTACT field contains information on how to contact a user. For example, the user's first and last name, address, city, state, real e-mail address and phone number may be contained in this field.

A BODY field contains the headline and text for the body of a personal advertisement and an EXPIRES field contains a date on which the advertisement expires. The advertisements imparted from the newspapers have natural expiration dates but users who generate advertisements through the PON system via a public network (e.g. the world wide wed) do not have natural expiration dates because it is desirable to not cancel advertisements which are actively being used. Thus, user information is entered into the APIS or PONS databases through a newspaper and the user also logs onto the PON web site, then if the newspaper advertisement expires, the PON account may be maintained if it has been used or is being used. Thus, the PON database is periodically examined to determined whether users who have advertisements are utilizing the PON system (e.g. logging into the PON system through a public network, utilizing functions of the PON system, etc.)

Table 142 also contains a plurality of field related to personal information of a user. Such fields are represented in table 142 as a single USER_PROFILE field. USER_PROFILE field 142 may contain, for example, information such as the user's sex, birthday, religion, whether or not they have children, smoking, drinking, body type, etc. This information is entered by the user during a user registration process implemented by user registration system 105 (FIG. 3).

A HAS_PROFILE field is used to determine whether a user has completed a user profile by entering information into the USER_PROFILE field. The HAS_PROFILE field is required because users who have not completed user profiles cannot be matched using the automatch and path features of the system.

A HAS_GREETING field indicates whether a user has a greeting stored in a storage device of PON system 100 such as database 104. The greeting file is preferably stored in a predetermined directory of a disk drive or other storage device. A HAS_REMOTE_GREETING field indicates whether a user has a greeting on an audiotext machine. If the user does not have a greeting on an audiotext machine then a telephone number (e.g. a 900 number) used to call the audiotext machine is not listed and thus is not displayed when this member's advertisement is displayed to other users.

Figure 4B:
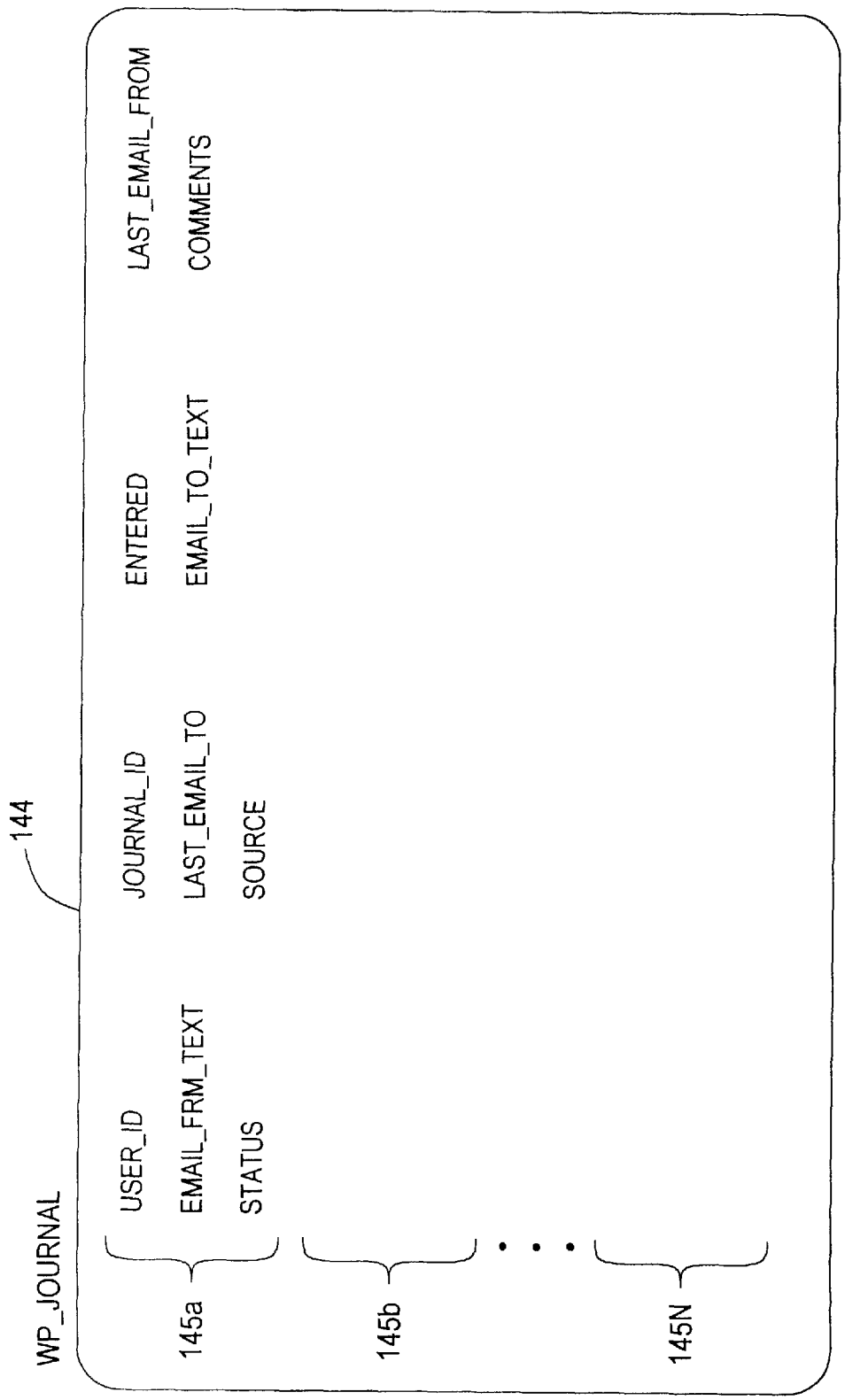

As shown in FIG. 4B, a table 144 contains information relating to user journal entries. For each of N users, the database table 144 has a corresponding row 145a–145N (i.e. the table has one row per journal entry for each user). Each row 145a–145N includes the USER ID field, a JOURNAL field, an ENTERED Field, a LAST_EMAIL_FRM Field, an EMAIL_FRM_TEXT field, a LAST_EMAIL_TO field, an EMAIL_TO_TEXT field, a COMMENTS field, a STATUS field and a SOURCE field.

Figure 4C:
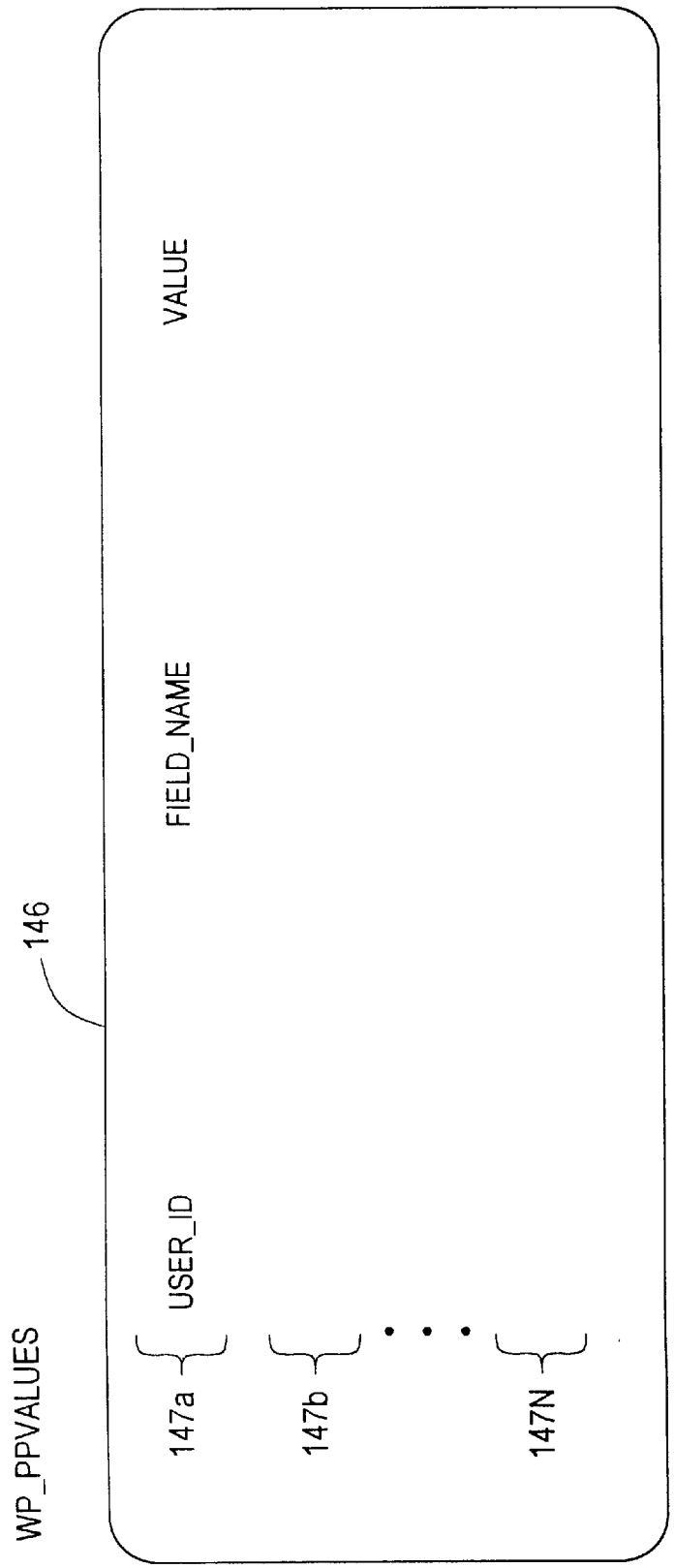

As shown in FIG. 4C, a table 146 includes information relating to values for personals pages for each user. For each of N users, the database table 146 has a corresponding row 147a–147N, which includes the USER_ID field, a FIELD_NAME field which contains the name of fields in a user personal page template. By using the same field names in different personal page templates, in the event the user elects to switch to a different personal page template, the values stored in these fields can be automatically transferred to the new template. Row 147 also includes a VALUE field which contains information to be displayed in the FIELD_NAME field. Thus, if the FIELD_NAME field contains the name of a field in which text will be displayed on the personal page, then the VALUE field could contain text which would be displayed in the corresponding field of the personal page.

Figure 4D:
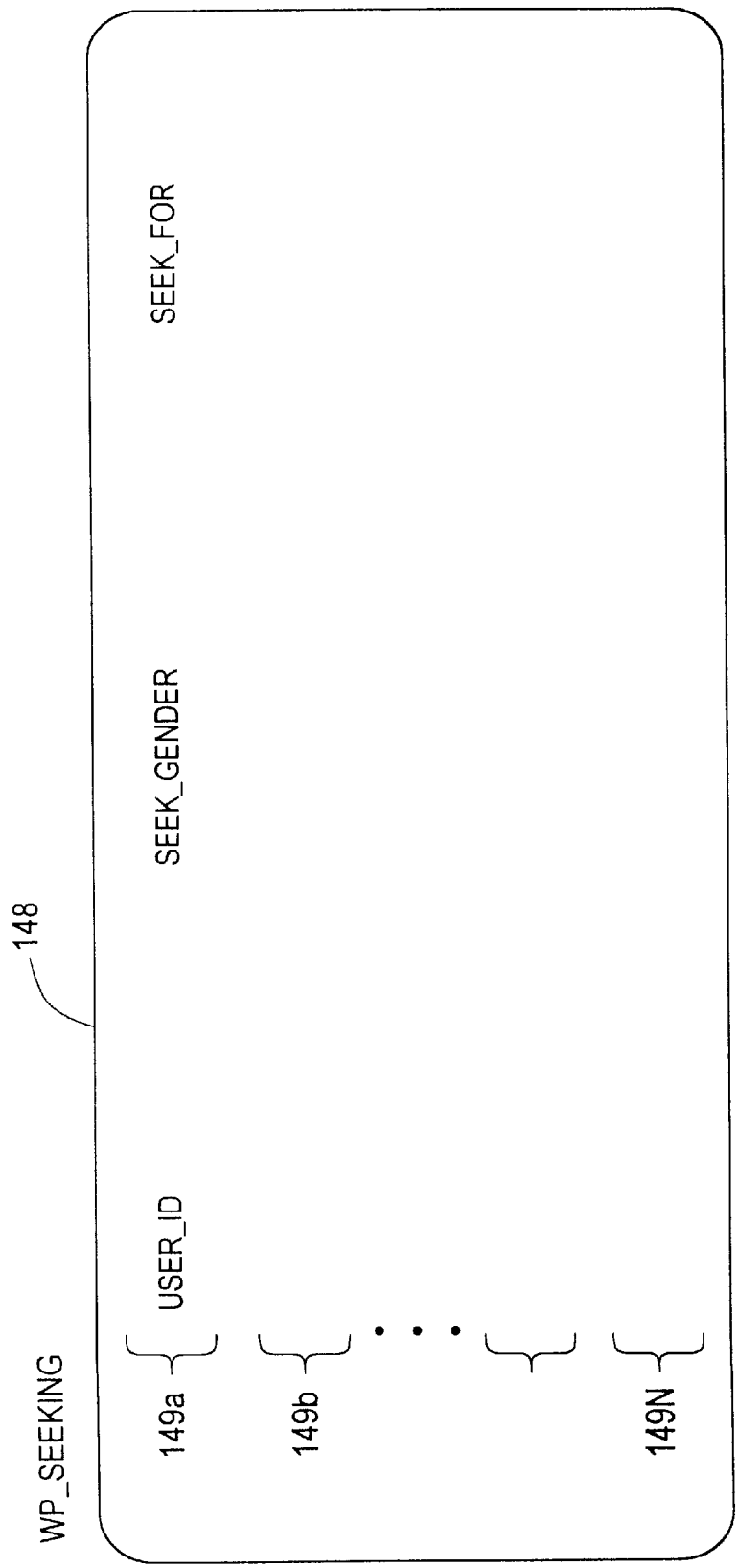

As shown in FIG. 4D, additional user information relating to the type of relationship sought by a user is found in table 148. For each of N users, the database table 148 has at least one corresponding row 149a–149N, which contains the USER_ID field, a SEEK_GENDER field, and a SEEK_FOR. This information is used to determine the particular gender type of a partner being sought by a system user. Table 148 is provided as a separate table because a single user may have multiple records. That is, a single user may a first entry indicating that the user is a of male gender and is seeking a female for a relationship. The same user may also have a second entry indicating that the user is a male seeking another male for an activity partner in which to engage in sports activities. Thus table 148 may have multiple rows corresponding to different entries for the same user.

Figure 4E:
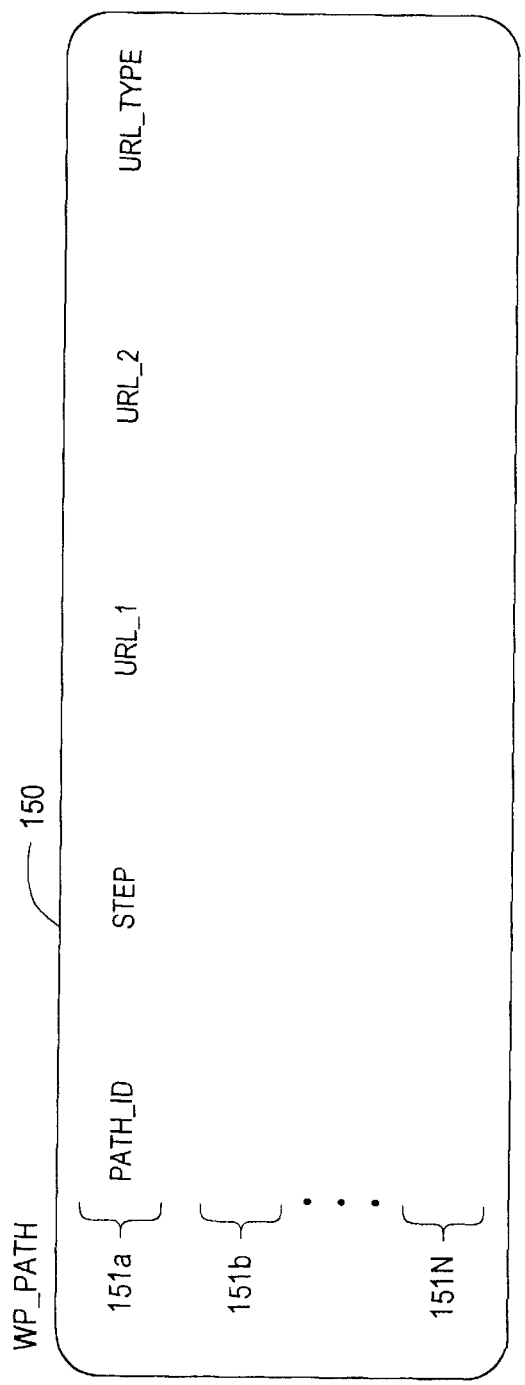

Table 150 shown in FIG. 4E, includes user information relating to the choices offered to users in each step of several different paths offered to users through path matching system 110. Each path available to users may be provided having a different theme. The possible paths accessible by a user through the path matching system 110 (FIG.) 3 are explained in more detail in the above-reference patent application entitled METHOD AND APPARATUS FOR HEURISTIC MATCHING. Database table 150 includes rows 151a–151N each of which include a PATH_ID field which contains an identifier of the possible paths which may be selected by users, a STEP field which contains the possible selections a particular user may take in each path, a first universal resources locator field (URL_1), and a second URL field URL_2, and a URL_TYPE field each of which are used to access information to be presented to a user.

Figure 4F:
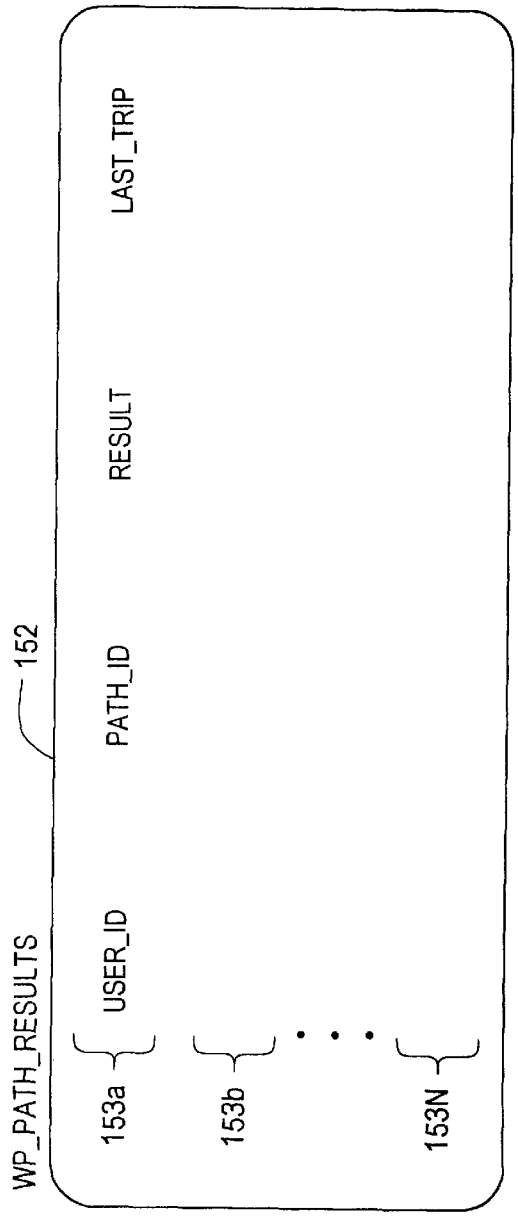

Table 152 shown in FIG. 4F, includes user information relating to the selection resultant from each user utilizing the path matching system 110 (FIG.) 3. The database table 152 has a plurality of rows 153a–153N, each of which includes the USER_ID field, the PATH_ID field which contains an identifier of the particular path selected by the user, a RESULT field which contains the particular selections taken by a particular user AND a LAST_TRIP field which contains a value indicating the last time at which this user took this path. It should be noted that there may be more than one record per user if the user has taken multiple paths.

Figure 4G:
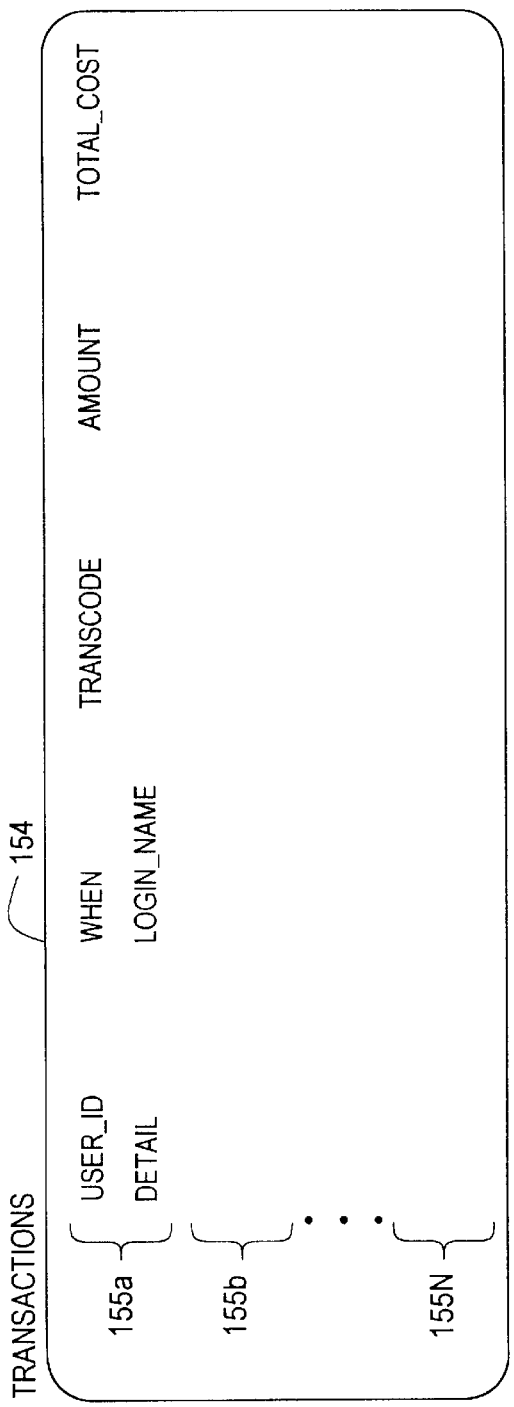
Figure 4H:
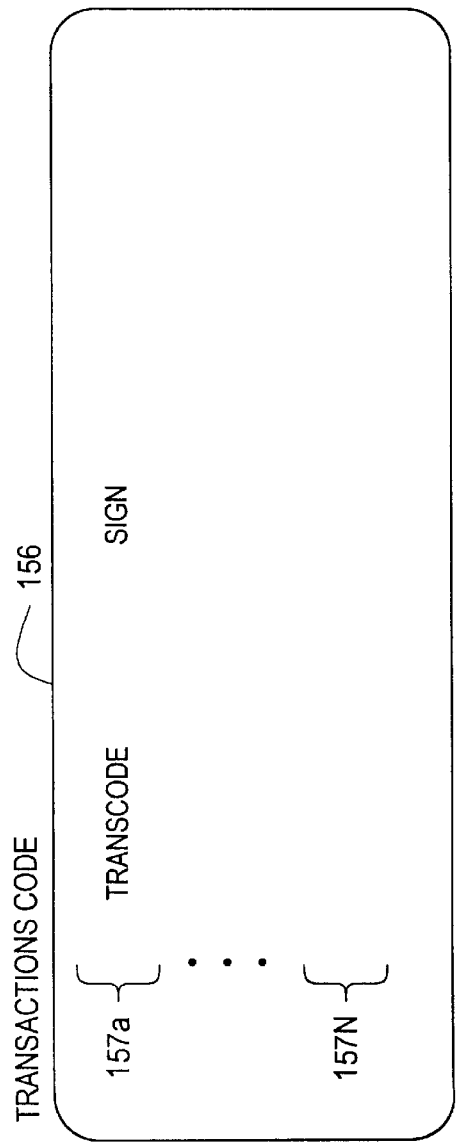

As shown in FIGS. 4G and 4H, additional user information relating to the type of transactions conducted by a user is found in tables 154 (FIG. 4G) and 156 (FIG. 4H). Table 154 is used to track the stamp usage and other significant events in the PON database. For each of N users, the database table 154 has a corresponding row 155a–155N, which includes the USER ID field, a WHEN field, a TRANSCODE field, an AMOUNT field, a TOTAL COST field, a DETAIL field and a LOGIN_NAME field. The TRANSCODE Field may have a number of entries including an ADD TO PAPER entry which indicates that an ad was sent to a newspaper, a BUY STAMPS entry which indicates whether stamps where bought via a 900 number, a CALL CTRSTAMPS entry which indicates that stamps were bought via a call center, a CARDSTAMPS entry which indicates that stamps where bought online via credit card, a CCARDREJECTED entry which indicates that stamps were taken back from the user because a credit card number given was rejected, a CHANGE HANDLE entry which indicates that the handle changes, a CHECKBOUNCED entry which indicates that stamps were taken back from the user because the check provided by the user bounced, a CHECKSTAMPS entry which indicates that stamps were bought via a mailed check and EXPIRED entry which indicates that a mail box was expired or canceled and had a predetermined number of stamps, a FREE entry indicates that stamps were for reimbursement or promotional purposes, a PPAGECREATE entry which holds the date on which a personal page was created, and a FAILEDPPAGEEDIT entry which records the date of personal page editing. The field also includes a REFUND entry, a REPLYANON entry which indicates whether anonymous email has been received and a REPLYAUTOANON entry which indicates whether anonymous email was sent not containing the FROM TO USER ID fields in the subject. The TRANSCODE field can include a SENDANON entry which indicates whether or not an anonymous email was sent and a 900STAMPS entry which indicates whether stamps were bought via a 900 number.

Table 155 contains all valid transaction codes and the polarity of the codes. For each of N users, the database table 156 has a corresponding row 157a–157N, which includes the TRANSCODE field and a SIGN field. The SIGN field contains an indication of whether a certain transaction should result in the addition of stamps to a user account, the subtraction of stamps from the user account and whether the transaction should have no effect on the number of stamps in the user account.

Figure 4I:
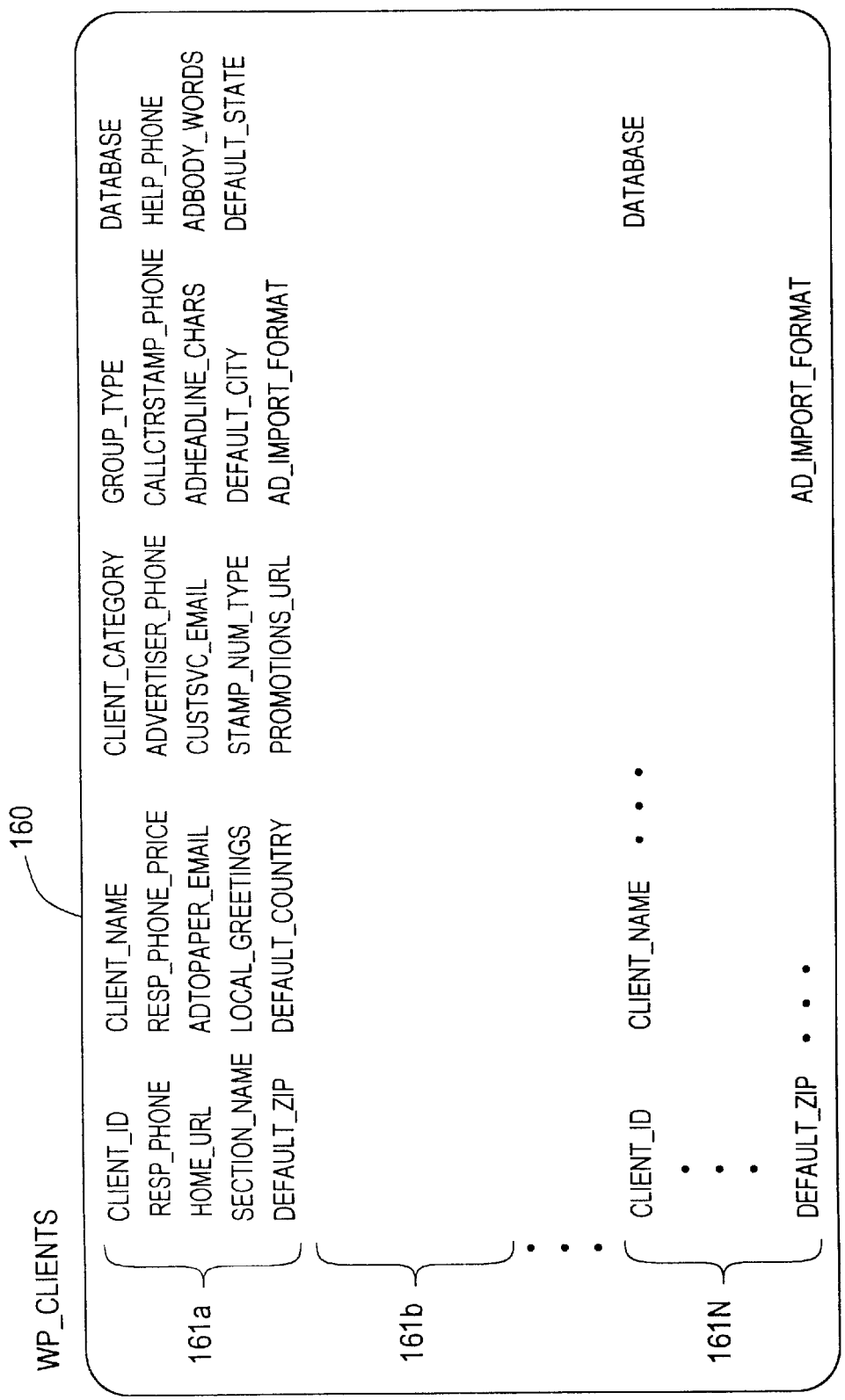

As shown in FIG. 4I, also included in the user information database 122 is a client information table 160 which holds a list of client newspapers and niche sites and the PON system and their associated parameters. Table 160 includes a CLIENT_ID field which is unique and used to relate to other tables. The CLIENT_ID field is a primary key. The CLIENT_ID field is typically provided as a short mnemonic for a full client name. For example, if a client is associated with a newspaper named The Phoenix, for example, an appropriate mnemonic may be PHX. If on the other hand the client is the personal-online system, the mnemonic may be TPON. Full names of the clients may, of course, also be used.

The table 160 also includes a CLIENT NAME field which holds the full client name (e.g. what would be printed on a page) and a CLIENT_CATEGORY field. The CLIENT_CATEGORY field includes a code NET which represents an Internet client and a client code NWS which represents a newspaper client. The CLIENT_CATEGORY field is used to determine whether a 900 number should be used or whether or not the user should be queried to determine whether the user desires to place have a personal advertisement in a newspaper if the user does not yet have a newspaper advertisement. The table 160 also includes a GROUP_TYPE field which is used to allow certain clients to see ads from other clients or not see ads and thus performs a client exclusion function.

The table also includes a RESPONDENT_PHONE field which hold a respondent 900 telephone number to search for audiotext machines. The table also holds a RESPONDENT_PHONE_PRICE field which contains the cost of the respondent 900 number on a permanent basis. The table also includes an ADVERTISER_PHONE field which contains the advertiser 800 number used to record greetings, etc.

A CALLCTRSTAMP_PHONE field contains a number used to call to order stamps from a call center while a HELP_PHONE field contains a phone number which may be used by a user to call for help placing ads. A HOME_URL field includes the URL to link to the client's home page. Thus, if a personal advertisement is provided from a newspaper named The Toronto Globe Newspaper, for example, then a link is placed on the users home page which allows the user to visit the Toronto Globe web site and vise versa.

The table 160 also includes an ADDTOPAPER_EMAIL field which holds an email address for sending personal advertisement for the newspaper clients. If a PON user chooses to place a newspaper advertisement, the advertisement information is sent this e-mail address which is the e-mail address of a call center representative. A CUSTSVC_EMAIL field includes a e-mail address for customer service of the newspaper client. An ADHEADLINE_CHARS field contains a value representing the maximum characters permitted in a newspaper advertisement headline. An ADBODY_WORDS field includes the maximum words permitted in the body of a newspaper advertisement.

A SECTION_NAME field contains a name that appears in some pages for newspaper clients. This entered by the PONS system administrator personnel based their knowledge of the newspaper. A LOCAL_GREETINGS field is set to "yes" if a greeting exists on the web server for the client or is set to "no" if no greeting exists on the web server. A STAMP_NUMBER_TYPE field contains information concerning the type of 900 stamp numbers owned by the client. For example, in one embodiment the letter O indicates that the client owns their own pay telephone number (e.g. a 900 number) and the letter D indicates that the client uses a default 900 number while the letter N indicates that the client does not use stamp 900 numbers. Table 160 also includes fields for default, city, state and zip code and country codes as shown.

Row 161a of table 160 further includes a PREMOTIONS_URL field which contains a URL to link the PON web site to a promotions page of the client. An AD_FORMAT field includes the format for advertisement files which may be provided having a file name extension of ".ADS". The advertisements can, however, have one of a plurality of different file formats. The file format for any particular file can be identified by examining the content of the file or by the file name extension. For example, file name extensions may be ".APIS", ".INI", ".TAB", or ".NONE". The format specifies which format the ad is in before being imputed into the PONS database.

As shown in FIG. 4J, a table 162 includes information relating to mailboxes in the PON database 104. The mailboxes are allocated in response to a user asking to record a voice greeting via audiotext greeting system 138 (FIG. 4). The mailboxes are again made available when the greeting arrives on the web server (e.g. server 102) and if necessary is converted from a first file format to a second file format. Such file format conversions are discussed herein below in conjunction with FIG. 6. For each of N users, the database table 162 may have a corresponding row 163a–163N, which includes a BOX_NO field, a PASSWORD field, an EXPIRES field and the USER_ID field.

Figure 5:
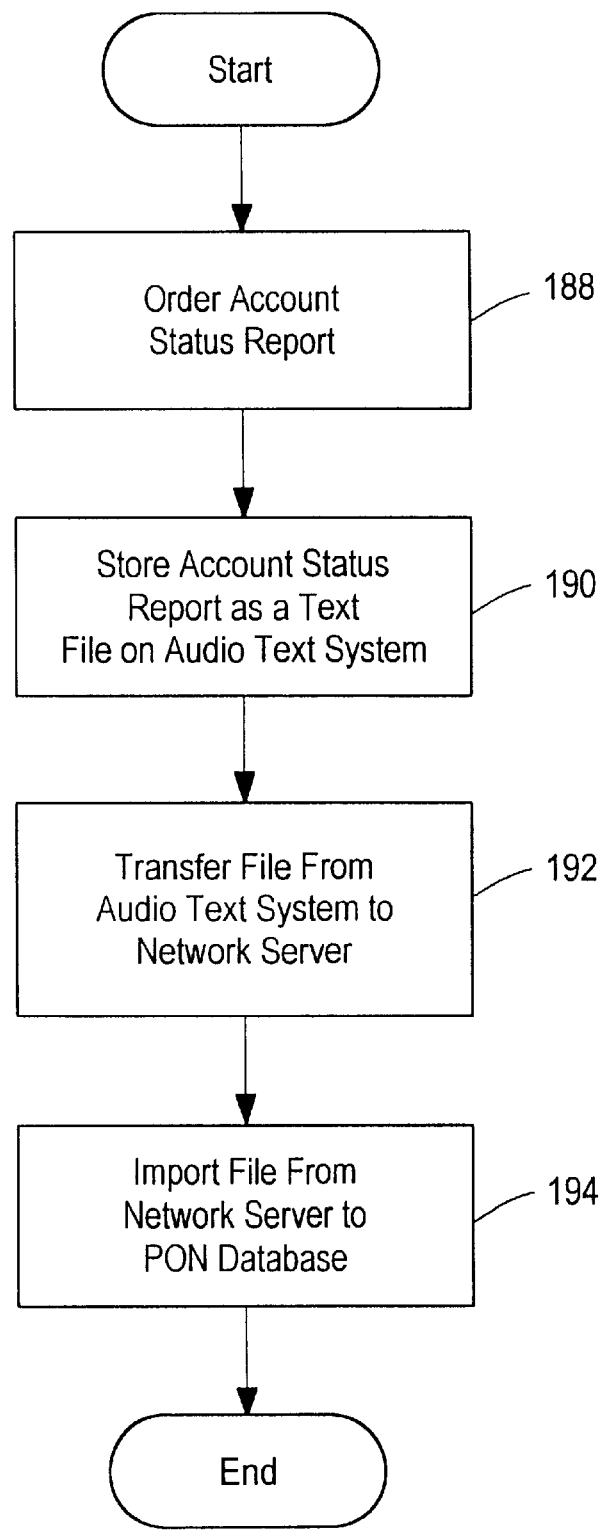
FIG. 5 is a flow diagram illustrating the processing required to transfer data to a database.
Figure 6:
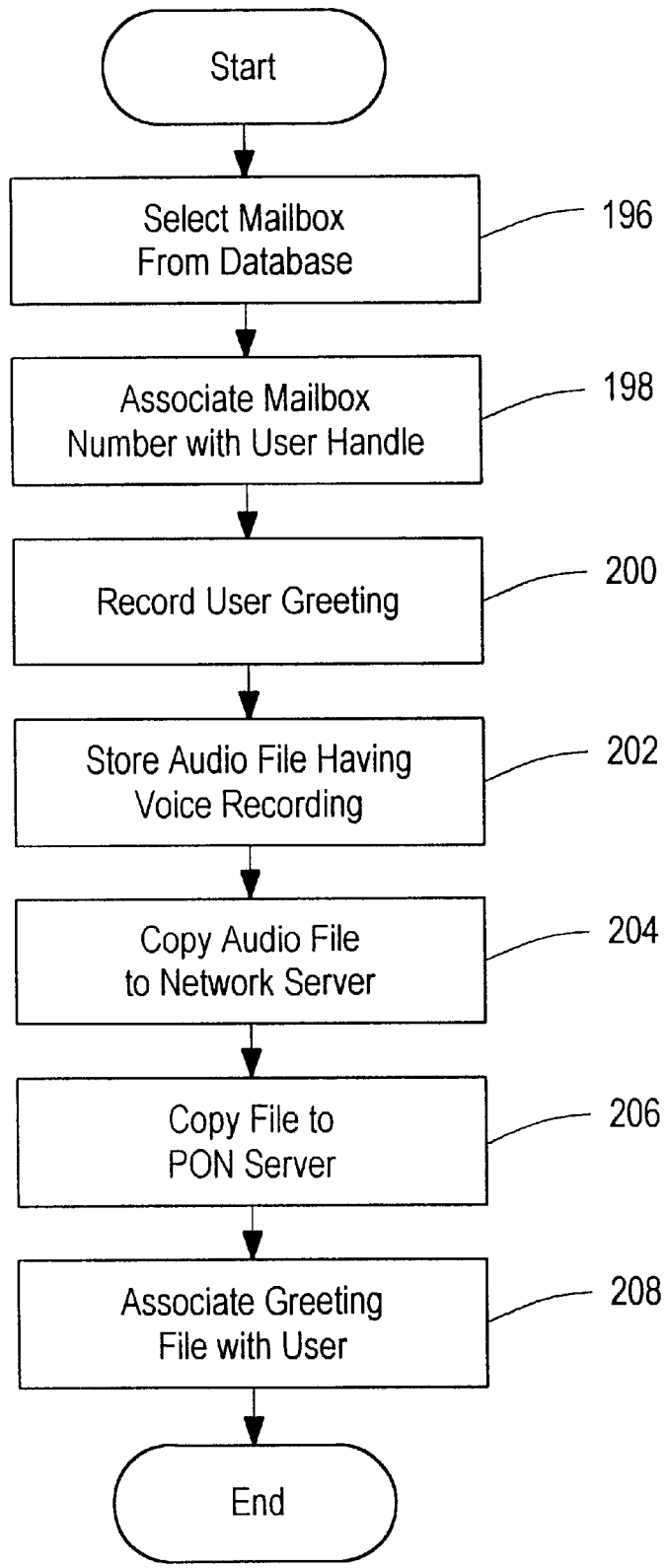
FIG. 6 is a flow diagram illustrating the processing to provide on online voice message.

FIGS. 5 and 6 are a series of flow diagrams showing the processing performed by PON system 54 (FIG. 1) to generate and receive information from ATS machines 44, 48 and to record a voice greeting accessible from PON 54 over a public network. The rectangular elements (typified by element 29 in FIG. 2), herein denoted "processing blocks," represent computer software instructions or groups of instructions.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Turning now to FIG. 5, the processing for PON system to receive data from a remote client begins with step 188 where PON system orders an account status report from an ATS machine such as ATS machines 44, 48. Processing then proceeds to step 90 where the account status report is stored as a text file on an ATS system. The file is stored on a predetermined directory of the ATS system and given a predetermined file name with a predetermined extension. The file is then transferred from the ATS machine to a server on a local area network such as server 38 coupled to local area network 14 described above in conjunction with FIG. 1. Next, as shown in step 194, PON server imports the file from the network server to the PON database. During such file transfer, the file may be renamed and placed in a predetermined format to facilitate storage in the database and to facilitate later processing of the information.

Referring now to FIG. 6, a process which allows web users to record voice greetings and have them accessible from the web page includes step 196 where a mailbox is selected from the PON database. Next, the mailbox number is associated with a handle of a user requesting the mailbox as shown in step 198. Next, the user records a greeting and an audio file having the voice recording is stored as shown in steps 200 and 202. Next, processing proceeds to step 204 where the file is copied to the network server in a predetermined format. The file is then copied from the network server to the PON server as shown in step 206 and at the PON server the voice file is associated with a particular user.

With reference again to the WP_BOXES Table, if a user wishes to record greetings using program 150, the user must receive a box number from the PON system 130. The box number is allocated from the WP_BOXES Table out of the PON database 122 and is displayed to the user so that the user knows the box number. The system also provides a telephone number which may be a toll free telephone number for the user to call such that the user can record a voice greeting. Thus, the user calls the 800 telephone number and records the voice greeting on a local audiotext system. Once the greeting is approved the greeting is copied to a file server such as network server 138 (FIG. 1) at a specified location and having an extension .RHT. This indicates that the file has a RHETOREX format. A Greeting File Conversion Processor (transfer 1) which checks a predetermined directory (APS/TPON/CLIENTID/ DIRECTORY for files with an RHT format. If the file came from the PON then the client ID will be in the PON directory. When the file conversion program transfer 1 finds such files it converts them from the RHT format to a wave format and renames the file in the same director with a .WAV extension. A MOVE NET TO WEB processor checks a predetermined director for WAV files. When the MOVE NET TO WEB processor locates any such files, the way the files are transferred to the PONS server via a transferred protocol or any other known protocol. The FTP protocol allows users to transfer files from computer to computer or access and download public files located on an anonymous FTP site. The PONS server takes the base file name and determines who the box number is assigned to by looking in the WP_BOXES Table to determine the corresponding handle on the PONS system.

The file is then converted from the WAV format to a RealAudio format and uses a ".RA" extension (e.g., "file_ name.ra"). The file is then ready for use and the user information table 142 of database 122 is updated to indicated that the user now has a greeting.

It should be noted that each handle corresponds to a unique user identifier. Thus, the file name HANDLE.RA is stored in a specific director for use by the PONS System Web site. This allows all PON system files to be stored in a single directory. It should be noted that box numbers are only unique within a single client and thus each client has a list of box numbers and passwords. Thus, it is necessary to keep these in separate directories for separate clients.

Under a predetermined directory on the network server (e.g server 38 of FIG. 1) therefore, there exists separate directories for each client (e.g., PON, BOS, Phoenix, WOR Phoenix, and other in-house clients) in which greetings can be copied. Thus, when these greetings are copied to the web site they must still be kept in separate directories until they are renamed by handle as described above. It should also be noted that the greeting recording system 138 must be used for all remote ATS clients due to the high cost (both dollar wise and resource wise) of to transferring files from a remote ATS machine to PONS. Members with greetings on local ATS machines can have their voice greetings copied or can record a new greeting using system 138. Also, non-newspaper clients must utilize the audiotext greeting system 138.

Figure 7:
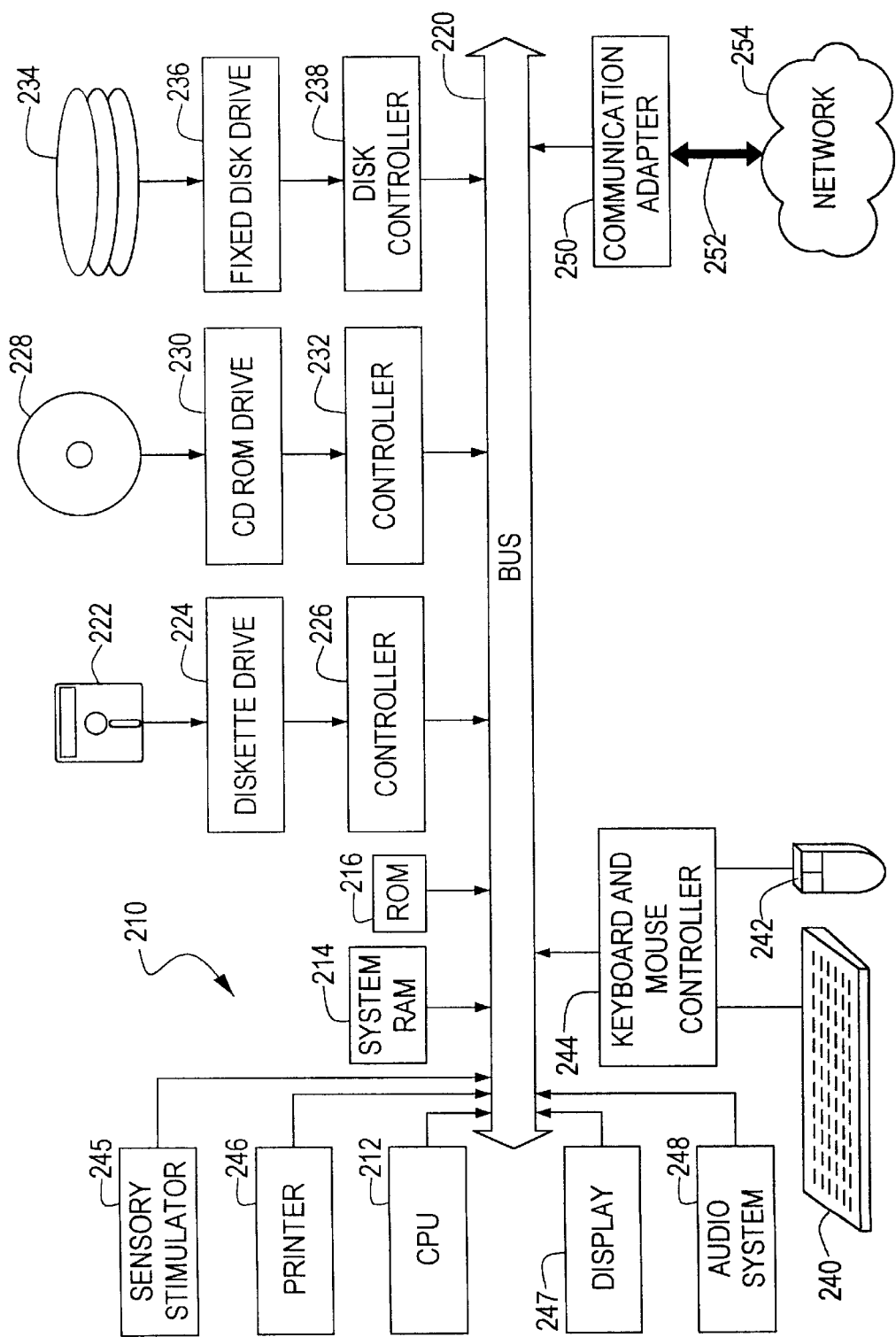
FIG. 7 is a block diagram of a computer system adapted for use with the present invention.

Referring now to FIG. 7, a computer system 210 on which the invention may be implemented is shown. Computer system 210 may be provided, for example, as an IBM compatible computer or any other equivalent computer system. The exemplary computer system 210 of FIG. 7 is for descriptive purposes only. Although the description may refer to terms commonly used in describing particular computer systems, the description and concepts equally apply to other processing systems, including systems having architectures dissimilar to that shown in FIG. 7.

Computer system 210 includes a central processing unit (CPU) 212, which may be provided, for example, as a conventional microprocessor, a random access memory (RAM) 214 for temporary storage of information, and a read only memory (ROM) 216 for permanent storage of information. Computer system 210 also includes a display 247, an audio system 248 and a sensory stimulator 245. Each of the aforementioned components are coupled to a bus 220. Operation of computer system 210 is generally controlled and coordinated by operating system software. The operating system controls allocation of system resources and performs tasks such as processing, scheduling, memory management, networking, and I/O services, among things. Thus, an operating system resident in system memory and executed by CPU 212 coordinates the operation of the other elements of computer system 210.

Also coupled to bus 220 is a non-volatile mass storage device which may be provided as a diskette 222. Diskette 222 is insertable into a diskette drive 224 which is, in turn, coupled to bus 220 by a controller 226. Similarly, a compact disc (CD) ROM 228 is insertable into a CD ROM drive 230 which is, in turn, coupled to bus 220 by a controller 228. A hard disk 234 is typically provided as part of a fixed disk drive 236 which is coupled to bus 220 by a disk controller 238.

Data and software may be provided to and extracted from computer system 210 via removable storage media such as diskette 222 and CD ROM 228. For example, data and text generated using techniques to be described below in conjunction with FIGS. 2–6 may be stored on storage media similar to media 222, 228. The data and text may then be retrieved from the media 222, 228 by CPU 212 and utilized by CPU 212 to perform matching, e-mail or other functions. Alternatively, CPU 212 may simply store such data and text in ROM 216.

Alternatively still, computer software useful for matching may be stored on storage media similar to media 222, 228. Such computer software may be retrieved from media 222, 228 for immediate execution by CPU 212 or by other processors included in one or more peripherals of computer system 210 such as display 247 audio system 248 or sensory stimulator 245. CPU 212 may retrieve the computer software and subsequently store the software in RAM 214 or ROM 216 for later execution.

User input to computer system 210 may be provided by a number of devices. For example, a keyboard 240 and a mouse 242 are coupled to bus 220 by a controller 244. Sensory stimulator 245 may also function as an input device and may be provided, for example, as a hand held sensor/vibration mechanism coupled to bus 220.

Computer system 210 also includes a communications adaptor 250 which allows the system to be interconnected to a local area network (LAN), a wide area network (WAN) or a public network, schematically illustrated by bus 252 and network 254. Thus, data and computer program software can be transferred to and from computer system 210 via adapter 250, bus 252 and network 254.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system for transferring data between a plurality of data storage devices coupled to a private network and a server coupled between the private network and a public network, the system comprising:

a server processor for receiving information from the private network and for providing information to users over the public network;

a database for storing a client identifier, a user identifier, user data information from users accessing the server processor from the public network and information retrieved by the server processor from the private network; and a first interface for retrieving information from each of the plurality of data storage devices, wherein at least one of the plurality of data storage devices is a local audiotext system; and a plurality of external audiotext greeting systems each having a processor and a storage device, said external audiotext greeting systems being coupled to said server processor via a telecommunication link for receiving audio messages from a user and for generating audio files having the audio messages stored therein;

means for storing the audio files in the storage device of said external audiotext greeting systems; and means for transferring the audio files from said external audiotext greeting systems to said server processor and for storing the audio files in a memory of the server processor; and a system for receiving the audio files and for making the audio files available to selected users over the public network.

2. The system of claim 1 wherein said server processor comprises:

a web server for providing information to users over the public network; and a database server coupled between said database and said web server for receiving data from said web server and for storing the data in said database and for retrieving data from said database and providing the data to the web server.

3. The system of claim 2 wherein said database includes a plurality of mailbox identifiers and a user handle, the system further comprises:

means for selecting a mailbox number from said database;

means for associating the mailbox number with the user handle; and means for associating the audio file with a user.

4. A network system comprising:

(a) a private network including a network server and a network communication path;

(b) an adtaking system coupled to said private network, said adtaking system including a database containing a client identifier and a client profile and a user profile including a user personal advertisement; and (c) a personals online system coupled between said private network and a public network, said personal online system including:

a server processor for providing information to users over the public network;

a user registration system for prompting a user to provide user profile information by displaying one or more forms to a user;

a personal page system for providing a personal page on which a user personal advertisement is displayed to users over the public network;

a personals online system database for storing the user profile information and the user personal page advertisement;

means for transferring the client identifier, the client profile and the user profile from the adtaking system database to the personals online system database;

at least one call center coupled to said private network, each of the at least one call centers for entering a personal advertisement; and at least one advertisement response machine on which responses to personal advertisements are stored.

5. The network system of claim 4 wherein said personals online system further comprises:

a system for receiving audio files and for making the audio files available to users over the public network.

6. The system of claim 5 further comprising:

an external audiotext greeting system having a processor and a storage device, said external audiotext greeting system coupled to said server processor for receiving audio messages from a user and for generating an audio file having the audio message stored therein;

means for storing the audio file in the storage device of said external audiotext greeting system; and means for transferring the audio file from said external audio text greeting to said server processor and for storing the audio file in a memory of the server processor.

7. The network system of claim 6 wherein said database includes a plurality of mailbox identifiers and a user handle.

8. The network system of claim 7 further comprises:

means for associating the mailbox number with the user handle; and means for associating the audio file with a user.

9. The network system of claim 8 wherein:

said audio file corresponds to a user voice greeting;

said personals online database includes a personal advertisement for each of a plurality of users; and wherein said personal on line system further includes:

means for transmitting the personal advertisement over a public network for display on a display screen of a user;

means for editing the personal advertisement; and means for reviewing the voice greeting.

10. A method of providing personal advertisements over a public network for matching personal advertisements of different users the method comprising the steps of:

(a) receiving a plurality of user profile information in response to a user entering information on a registration form displayed on a user display screen;

(b) storing the user profile information in a database;

(c) assigning a unique user identifier to the user;

(d) receiving the text of a user personal advertisement to be made available to other users over a public network;

(e) comparing the user profile information of the user to a second user;

(f) matching the first user with the second different user in response to a result of the matching step; and (g) updating the user profile information in the database by collecting an account status report from an audiotext system and storing the account status report in the database.

11. The method of claim 10 wherein the step of receiving user profile information comprises the steps of:

receiving an electronic mail address of the user;

verifying an electronic mail address of the user;

storing the electronic mail address of the user in the database;

storing in the database an indication of whether the user has verified the electronic mail address; and in response to the database indicating that the user has not verified the user electronic mail address, preventing the user from sending or receiving electronic mail.

12. The method of claim 11 further comprising the steps of:

storing in the database a client identifier for each of a plurality of clients and an advertisement import format identifier to indicate the format of a personal advertisement stored on an adtaking system database; and receiving from the adtaking system database, the client identifier and at least one personal advertisement, each of the at least one personal advertisements being in the format corresponding to the advertisement import format identifier.

13. The method of claim 12 wherein the step of receiving the account status report includes the steps of:

ordering the account status report from a predetermined audiotext system;

storing the account status report as a file in a memory of the predetermined audiotext system;

transferring the file from the memory of the predetermined audiotext system to a memory of a private network server in a predetermined file format; and importing the file from the memory of the private network server in the predetermined file format to the database.

14. The method of claim 13 wherein the step of storing the account status report as a file in a memory of the predetermined audiotext system includes the step of storing the account status report as a text file in a memory of the predetermined audiotext system.

15. The method of claim 14 wherein the step of storing user profile information in the database includes the step of storing a an indication of a user voice greeting in the database.

16. The method of claim 15 wherein the database includes a plurality of values corresponding to mailboxes and the method further comprises the step of recording a user voice greeting which is accessible over a public network, wherein the step of recording the user voice greeting comprises the steps of:

selecting a mailbox from the database;

associating the mailbox with a user handle available in a first voice greeting database, wherein the user handle cannot be associated with a user identifier in the voice greeting database;

recording a user greeting;

storing an audio file of the user greeting;

copying the audio file to a network server of a private network;

copying the audio file from the network server to a server accessible through a public network; and associating the audio file with a user identifier corresponding to the user handle.

17. The method of claim 16 further comprising the step of making the audio file available over the public network to users having information stored in the database.

* * * * *